US010997453B2

(12) United States Patent
Mondal et al.

(10) Patent No.: US 10,997,453 B2
(45) Date of Patent: May 4, 2021

(54) IMAGE SHADOW DETECTION USING MULTIPLE IMAGES

(71) Applicant: Adobe Inc., San Jose, CA (US)

(72) Inventors: Prasenjit Mondal, West Midnapore (IN); Anuj Shara, Delhi (IN); Ankit Bal, Noida (IN)

(73) Assignee: ADOBE INC., San Jose, CA (US)

(*) Notice: Subject to any disclaimer, the term of this patent is extended or adjusted under 35 U.S.C. 154(b) by 190 days.

(21) Appl. No.: 16/260,762

(22) Filed: Jan. 29, 2019

(65) Prior Publication Data

US 2020/0242388 A1 Jul. 30, 2020

(51) Int. Cl.
G06K 9/34 (2006.01)
G06T 7/13 (2017.01)
G06T 5/50 (2006.01)
G06T 5/00 (2006.01)

(52) U.S. Cl.
CPC ............ G06K 9/346 (2013.01); G06T 5/002 (2013.01); G06T 5/008 (2013.01); G06T 5/50 (2013.01); G06T 7/13 (2017.01)

(58) Field of Classification Search
CPC ...... G06K 9/346; G06K 9/00463; G06T 7/13; G06T 5/002; G06T 5/008; G06T 5/50; G06T 7/174; G06T 7/254
See application file for complete search history.

(56) References Cited

U.S. PATENT DOCUMENTS

| 9,430,715 B1* | 8/2016 | Wang | G06T 7/11 |
| 2002/0090126 A1* | 7/2002 | Oosawa | G06T 7/11 |
| | | | 382/132 |
| 2009/0028424 A1* | 1/2009 | Sato | H04N 5/235 |
| | | | 382/162 |
| 2009/0030275 A1* | 1/2009 | Nicolaou | G06T 5/008 |
| | | | 600/109 |
| 2009/0244309 A1* | 10/2009 | Maison | A63F 13/06 |
| | | | 348/222.1 |
| 2010/0118116 A1* | 5/2010 | Tomasz | G06T 15/10 |
| | | | 348/36 |
| 2010/0232705 A1* | 9/2010 | Li | G06K 9/00771 |
| | | | 382/195 |
| 2013/0004065 A1* | 1/2013 | Ma | G06T 7/90 |
| | | | 382/165 |
| 2014/0016862 A1* | 1/2014 | Taguchi | G06T 7/586 |
| | | | 382/165 |

(Continued)

OTHER PUBLICATIONS

Asaidi, et al., "Shadow Detection Approach Combining Spectral and Geometrical Properties", International Conference on Multimedia Computing and Systems, May 10-12, 2012, pp. 389-393.

(Continued)

Primary Examiner — Ming Y Hon
(74) Attorney, Agent, or Firm — F. Chau & Associates, LLC

(57) ABSTRACT

While a user holds a camera positioned relative to an object, a first image of the object and a second image of the object, as captured by the camera, may be obtained. Intensity variations between a first intensity map of the first image and a combination intensity map obtained from the first intensity map and a second intensity map of the second image may be compared. Then, a shadow may be identified within the first image, based on the intensity variations.

20 Claims, 17 Drawing Sheets

(56) References Cited

U.S. PATENT DOCUMENTS

| | | | | |
|---|---|---|---|---|
| 2014/0341464 | A1* | 11/2014 | Fan | G06T 5/008 |
| | | | | 382/154 |
| 2016/0227181 | A1* | 8/2016 | Ilic | H04N 5/232935 |
| 2016/0307147 | A1* | 10/2016 | Jones | G06K 9/4661 |
| 2016/0328827 | A1* | 11/2016 | Ilic | H04N 5/2624 |
| 2017/0237960 | A1* | 8/2017 | Kamm | H04N 5/332 |
| | | | | 348/46 |
| 2018/0089523 | A1* | 3/2018 | Itakura | G06T 7/194 |
| 2018/0376072 | A1* | 12/2018 | Kwon | A61B 5/0059 |

OTHER PUBLICATIONS

Chung, et al., "Efficient Shadow Detection of Color Aerial Images Based on Successive Thresholding Scheme", IEEE Transactions on Geoscience and Remote Sensing, vol. 47, No. 2, Feb. 2009, pp. 671-682.

Golchin, et al., "Shadow Detection Using Color and Edge Information", Journal of Computer Science, vol. 9, No. 11, 2013, pp. 1575-1588.

Guo, et al., "Single-Image Shadow Detection and Removal using Paired Regions", IEEE Conference on Computer Vision and Pattern Recognition, Jun. 20-25, 2011, pp. 2033-2040.

Heikkila, et al., "A Texture-Based Method for Modeling the Background and Detecting Moving Objects", IEEE Transactions on Pattern Analysis and Machine Intelligence, vol. 28, No. 4, Apr. 2006, pp. 657-662.

Jacques Jr., et al., "Background Subtraction and Shadow Detection in Grayscale Video Sequences", 18th Brazilian Symposium on Computer Graphics and Image Processing, Oct. 09-12, 2005, pp. 189-196.

Kampel, et al., "Improved Motion Segmentation Based on Shadow Detection", Electronic Letters on Computer Vision and Image Analysis, vol. 6, No. 3, 2007, pp. 1-12.

Leone, et al., "A Texture-Based Approach for Shadow Detection", IEEE Conference on Advanced Video and Signal Based Surveillance, Sep. 15-16, 2005, pp. 371-376.

Leone, et al., "Shadow Detection for Moving Objects Based on Texture Analysis", Pattern Recognition, vol. 40, No. 4, Apr. 2007, pp. 1222-1233.

Liu, et al., "A Statistical Approach for Shadow Detection Using Spatio-Temporal Contexts", IEEE 17th International Conference on Image Processing, Sep. 26-29, 2010, pp. 3457-3460.

Liu, et al., "Real-Time On-Road Vehicle Detection Combining Specific Shadow Segmentation and SVM Classification", IEEE Second International Conference on Digital Manufacturing & Automation, Aug. 5-7, 2011, pp. 885-888.

Liu, et al., "Shadow Detection in Remotely Sensed Images Based on Self-Adaptive Feature Selection", IEEE Transactions on Geoscience and Remote Sensing, vol. 49, No. 12, Dec. 27, 2011, pp. 5092-5103.

Luus, et al., "Adaptive Threshold-Based Shadow Masking for Across-Date Settlement Classification of Panchromatic QuickBird Images", IEEE Geoscience and Remote Sensing Letters, vol. 11, No. 6, Jun. 2014, pp. 1153-1157.

Ma, et al., "Shadow Removal Using Retinex Theory", Third Chinese Conference on Intelligent Visual Surveillance, Dec. 1-2, 2011, pp. 25-28.

Shi, et al., "Shadow Detection in Color aerial Images Based on HSI Space and Color Attenuation Relationship", EURASIP Journal on Advances in Signal Processing, vol. 141, 2012, 13 pages.

Song, et al., "Shadow Detection and Reconstruction in High-Resolution Satellite Images via Morphological Filtering and Example-Based Learning", IEEE Transactions on Geoscience and Remote Sensing, vol. 52, No. 5, May 2014, pp. 2545-2554.

Sun, et al., "Retinex Theory-Based Shadow Detection and Removal in Single Outdoor Image", Industrial Robot: An International Journal, vol. 36, No. 3, 2009, pp. 263-269.

Sun, et al., "Shadow Detection and Removal from Solo Natural Image Based on Retinex Theory", Intelligent Robotics and Applications Lecture Notes in Computer Science, vol. 5314, 2008, pp. 660-668.

Wang, et al., "Shadow Detection of Urban Aerial Images Based on Partial Differential Equations", Proceedings ISPRS Congr., Comm. II, vol. 37, Jul. 2008, pp. 325-328.

Xu, et al., "Indoor Shadow Detection for Video Segmentation", IEEE International Conference on Multimedia and Expo, 2004, pp. 41-44.

Xu, et al. "Insignificant Shadow Detection for Video Segmentation", IEEE Transactions on Circuits and Systems for Video Technology, vol. 15, No. 8, Aug. 2005, pp. 1058-1064.

* cited by examiner

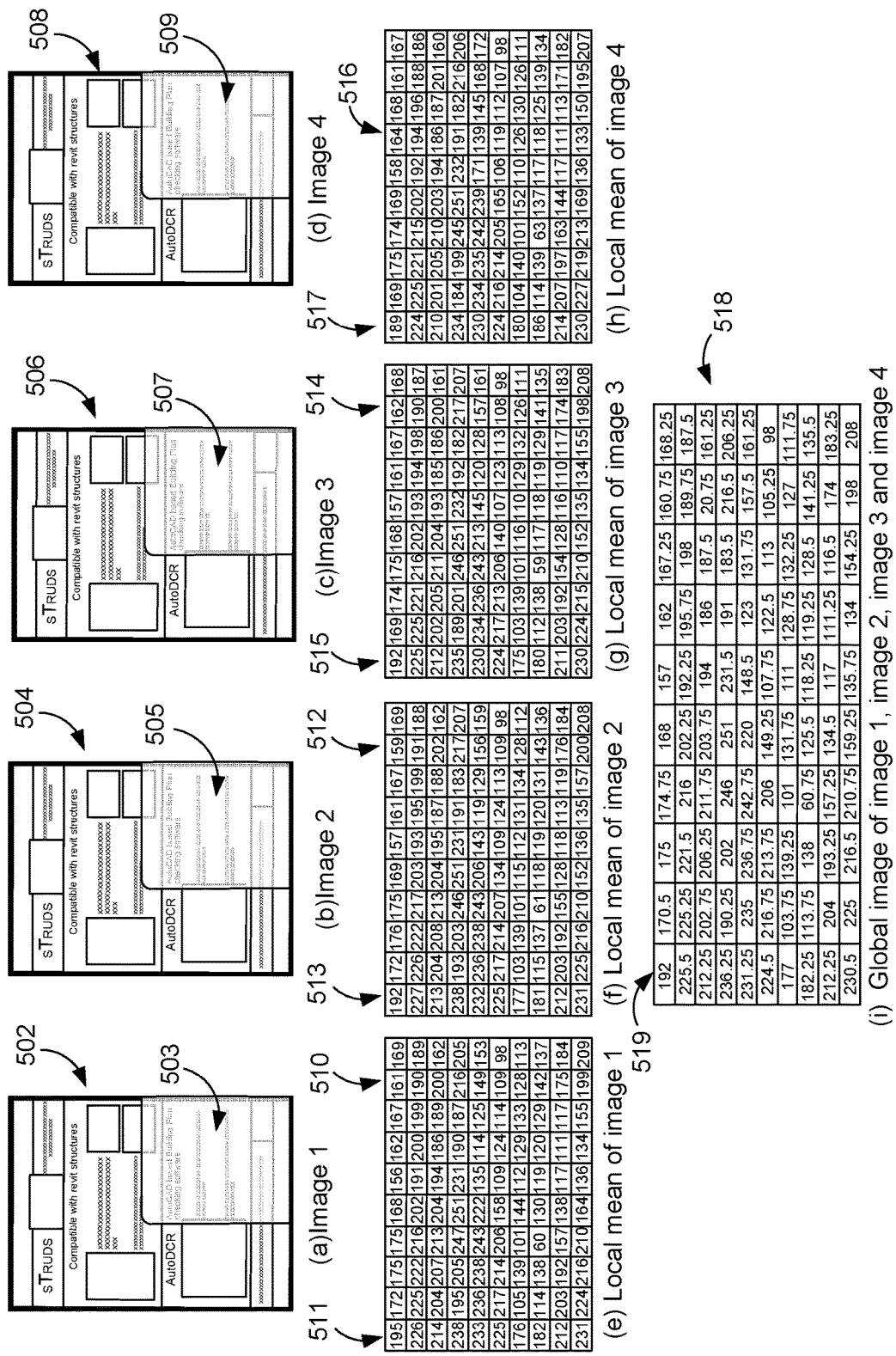
FIG. 5 Continue Next Page

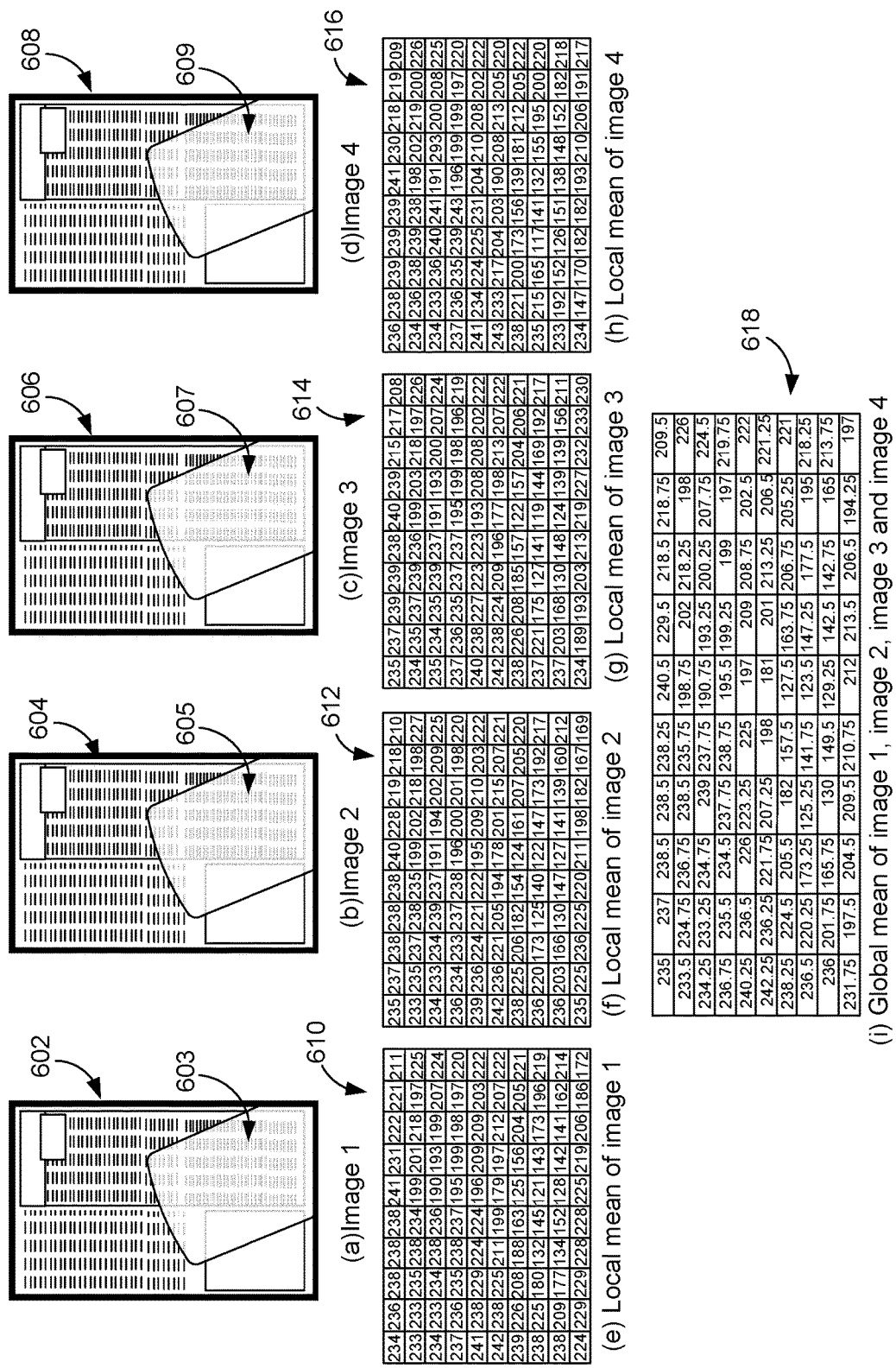
FIG. 6 Continue Next Page

FIG. 6

(n) Variation of image 1, image 2, image 3 and image 4 (as shown in (j) to (m) are resized with respect to the original images in (a) to (d) to show the correspondence between the hard shadow movement regions in original images and the variations computed

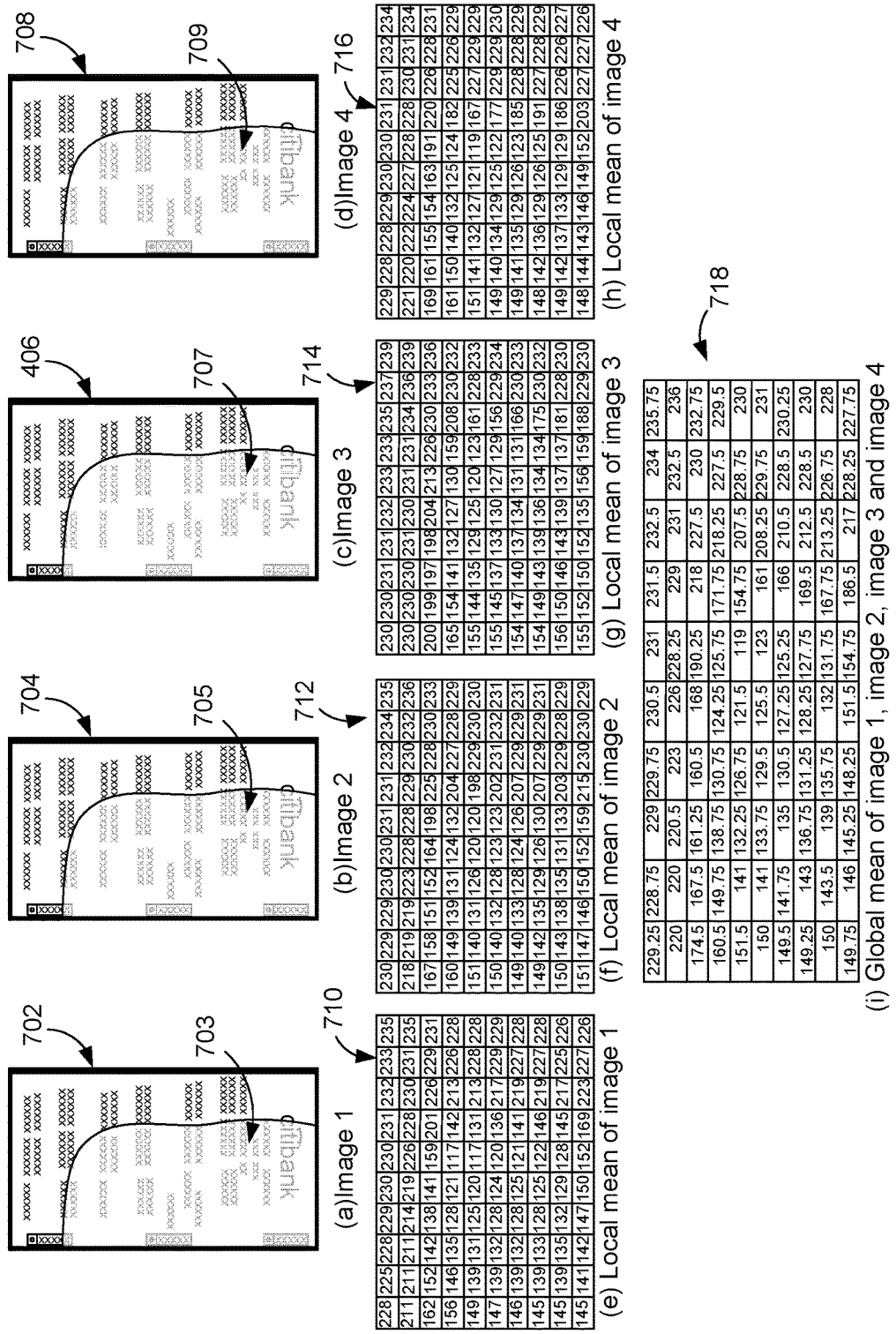
FIG. 7 Continue Next Page (j) Variation of image 1 with respect to global mean (k) Variation of image 2 with respect to global mean (l) Variation of image 3 with respect to global mean (m) Variation of image 4 with respect to global mean

FIG. 7

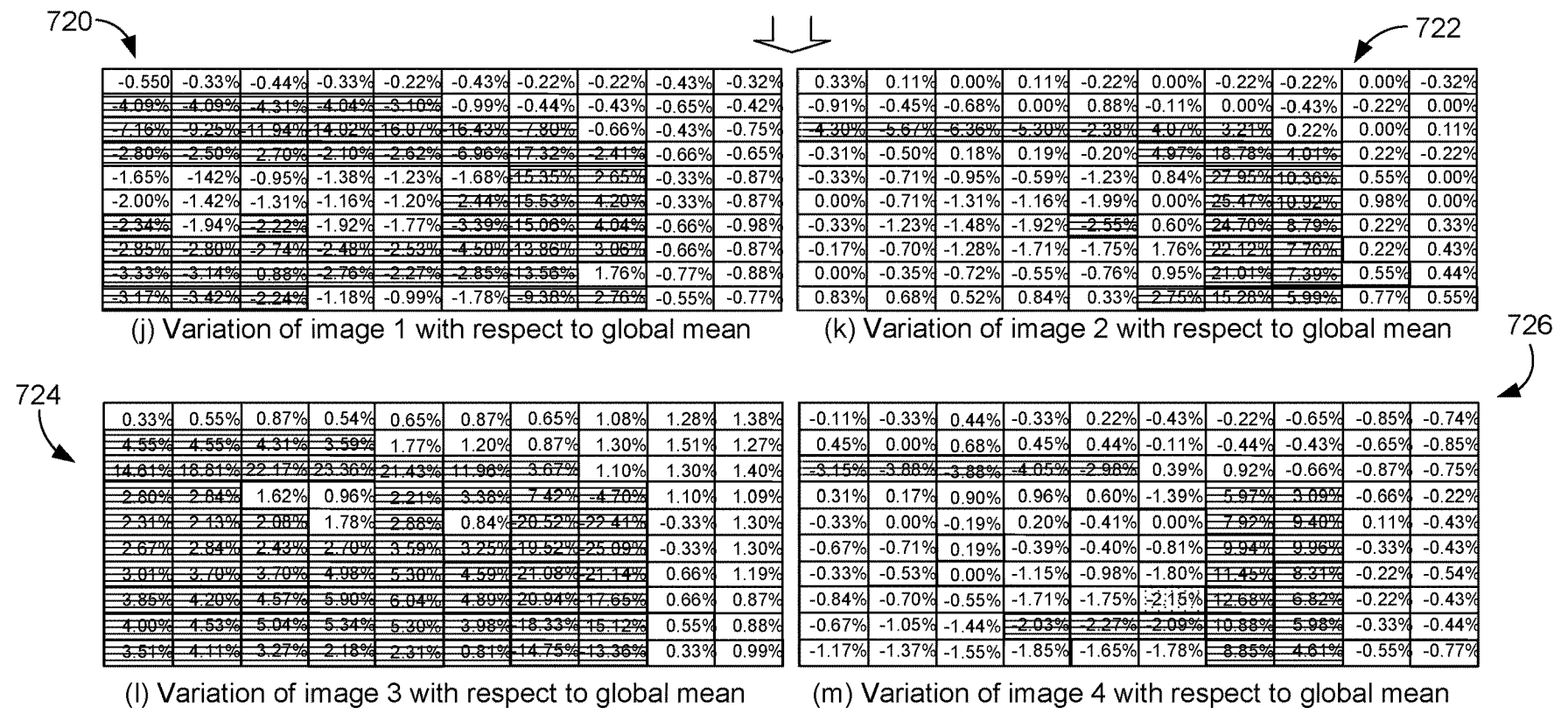

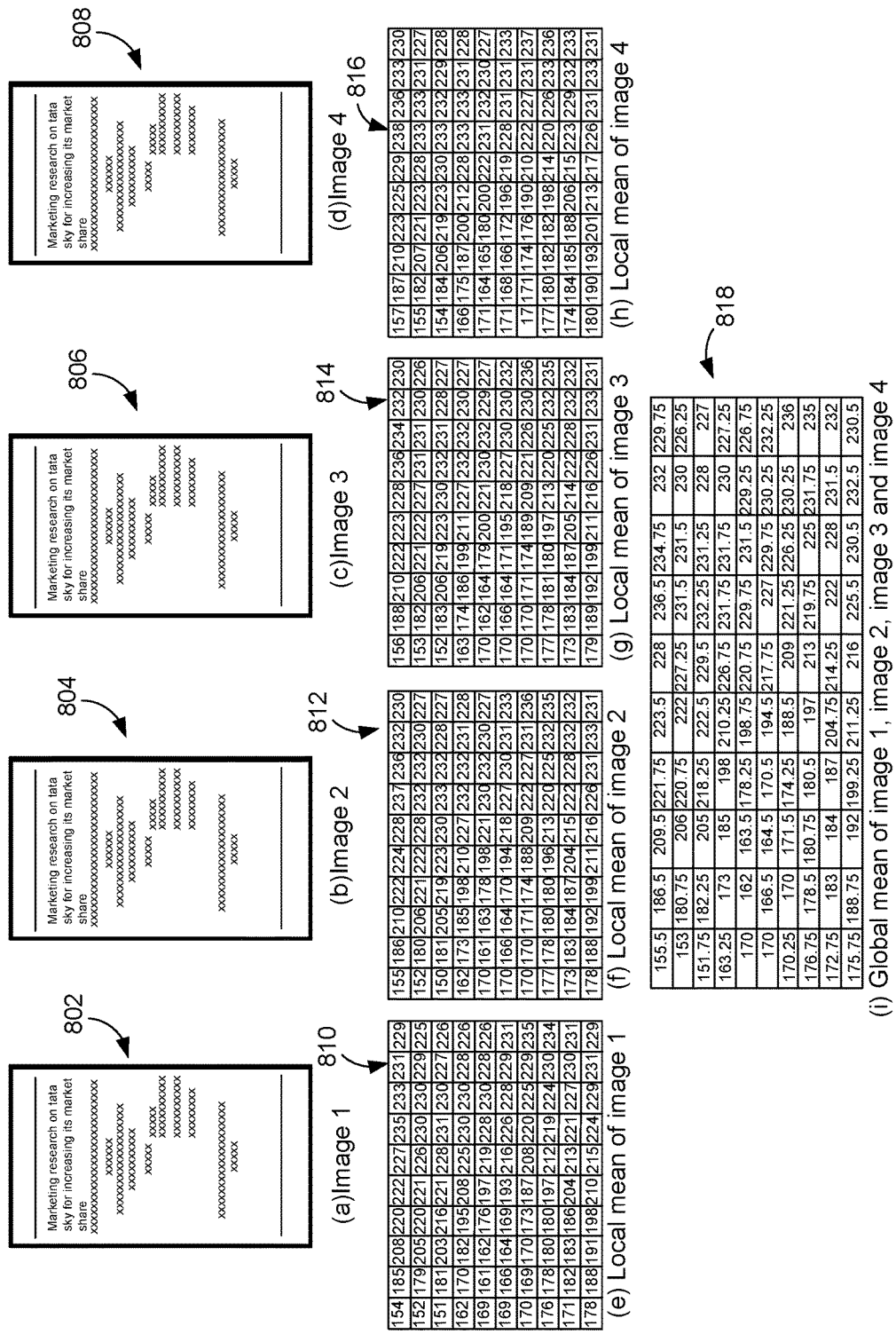
FIG. 8 Continue Next Page

FIG. 8

FIG. 9 Continue Next Page

| 34.77% | 29.35% | 24.65% | 19.39% | 13.58% | -2.77% | 0.00% | 0.38% | 1.19% | 1.45% | | 11.94% | 10.13% | 8.72% | 7.10% | 5.68% | 2.05% | 1.47% | 1.39% | 1.19% | 0.92% |
|---|---|---|---|---|---|---|---|---|---|---|---|---|---|---|---|---|---|---|---|---|
| -1.90% | -1.22% | -0.66% | -0.11% | -0.11% | -0.11% | 0.00% | 0.59% | 0.97% | 0.61% | | 0.78% | 0.55% | 0.22% | 0.33% | 0.33% | 0.78% | 0.91% | 1.06% | 0.97% | 0.12% |
| 0.22% | -0.53% | -0.42% | 0.00% | 0.32% | 0.21% | 0.33% | 0.55% | 0.57% | 0.34% | | 0.22% | -0.11% | 0.00% | -0.11% | -0.11% | 0.21% | 0.33% | 0.55% | 0.57% | 0.79% |
| 1.33% | 0.95% | 0.21% | 0.52% | 0.31% | 0.31% | 0.21% | 0.53% | 0.65% | 0.22% | | -0.65% | -0.74% | -0.21% | -0.31% | -0.10% | 0.31% | 0.21% | 0.11% | 0.22% | -0.22% |
| 0.34% | 0.54% | 0.52% | 0.63% | 0.52% | 0.31% | 0.31% | 0.42% | 0.32% | 0.75% | | -0.88% | -0.75% | -0.31% | -0.21% | -0.21% | -0.10% | -0.10% | 0.00% | 0.32% | -0.11% |
| 0.34% | 1.30% | 1.28% | 0.95% | 0.85% | 0.53% | 0.11% | 0.00% | 0.21% | 0.32% | | -0.56% | -0.87% | -0.85% | -0.32% | -0.42% | -0.32% | -0.32% | 0.00% | 0.21% | 0.75% |
| 0.93% | 1.04% | 1.12% | 1.00% | 0.66% | 0.44% | 0.65% | 0.11% | 0.22% | 0.11% | | -0.56% | -0.81% | -0.67% | -0.33% | -0.22% | -0.44% | -0.22% | -0.32% | 0.22% | -0.33% |
| 0.73% | 0.85% | 1.31% | 1.17% | 0.68% | 0.56% | 0.33% | 0.33% | 0.22% | 0.68% | | -0.93% | -1.10% | -1.07% | -0.70% | -0.23% | -0.23% | -0.11% | -0.11% | 0.22% | 0.23% |
| 0.37% | 0.50% | 0.76% | 1.00% | 1.09% | 0.70% | 0.57% | 0.58% | 0.23% | -0.12% | | -0.73% | -0.62% | -0.76% | -0.50% | -0.36% | -0.36% | -0.34% | -0.34% | -0.23% | -1.05% |
| 0.73% | 0.50% | 0.52% | 0.53% | 0.51% | 0.60% | 0.35% | 0.47% | 0.24% | 0.96% | | -0.73% | -0.73% | -0.52% | 0.53% | -0.36% | -0.52% | -0.12% | -0.47% | -0.34% | -0.48% |

(j) Variation of image 1 with respect to global mean      (k) Variation of image 2 with respect to global mean

| 11.41% | 10.13% | 8.22% | 6.60% | 4.20% | 0.60% | -0.49% | -0.63% | -0.40% | -1.71% | | 10.88% | 9.09% | 7.71% | 5.60% | 3.70% | 0.12% | -0.98% | -1.13% | -1.98% | -0.66% |
|---|---|---|---|---|---|---|---|---|---|---|---|---|---|---|---|---|---|---|---|---|
| 0.78% | 0.55% | 0.22% | -0.11% | -0.11% | -0.11% | -0.45% | -0.82% | -0.49% | -0.36% | | 0.34% | 0.11% | 0.22% | -0.11% | -0.11% | -0.55% | -0.45% | -0.82% | -1.46% | -0.36% |
| 0.22% | 0.32% | 0.00% | 0.00% | -0.11% | -0.21% | -0.54% | -0.78% | -0.34% | 0.34% | | 0.22% | 0.32% | 0.42% | 0.00% | -0.11% | -0.21% | -0.11% | -0.33% | -0.79% | -1.46% |
| -0.44% | -0.32% | -0.21% | -0.31% | -0.10% | -0.10% | -0.21% | -0.32% | -0.22% | 0.65% | | 0.00% | 0.11% | 0.21% | 0.10% | -0.52% | -0.21% | -0.32% | -0.65% | -1.39% | |
| 0.34% | 0.11% | -0.31% | -0.21% | -0.31% | -0.10% | -0.10% | -0.22% | -0.22% | 0.75% | | -0.11% | 0.11% | 0.10% | -0.21% | -0.10% | -0.42% | -0.54% | -0.65% | -1.39% | -0.54% |
| -0.11% | -0.43% | -0.32% | -0.42% | -0.22% | -0.32% | 0.00% | 0.00% | -0.11% | -0.54% | | 0.34% | 0.00% | 0.00% | 0.11% | 0.11% | 0.00% | -0.21% | -0.54% | 1.41% | 1.41% |
| 0.00% | 0.12% | 0.22% | -0.33% | -0.23% | -0.22% | 0.00% | 0.11% | -0.21% | -1.19% | | 0.00% | -0.35% | -0.22% | -0.33% | -0.22% | 0.00% | 0.11% | -0.22% | -0.23% | -0.23% |
| 0.24% | 0.37% | -0.12% | -0.23% | 0.00% | 0.11% | -0.11% | -0.22% | 0.23% | -0.68% | | -0.24% | -0.12% | -0.12% | -0.23% | -0.34% | -0.34% | -0.12% | -0.35% | -0.23% | -0.12% |
| 0.37% | 0.50% | 0.25% | 0.00% | 0.53% | -0.23% | -0.11% | 0.12% | 0.23% | 1.28% | | -0.12% | -0.50% | -0.25% | -0.36% | -0.23% | -0.23% | -0.23% | -0.36% | -0.24% | |
| 0.24% | 0.50% | 0.52% | 0.53% | 0.00% | -0.36% | -0.12% | 0.00% | 0.24% | 0.48% | | -0.24% | -0.50% | -0.50% | -0.51% | -0.53% | -0.51% | -0.36% | -0.12% | 0.00% | -0.96% |

(l) Variation of image 3 with respect to global mean      (m) Variation of image 4 with respect to global mean

FIG. 9

IMAGE SHADOW DETECTION USING MULTIPLE IMAGES

TECHNICAL FIELD

This description relates to shadow detection in digital image processing.

BACKGROUND

The image quality of a digital image is typically reduced when unwanted shadows are captured. Further, subsequent uses of the digital image may be unavailable or compromised. For example, text captured in the digital image may be obscured. Then, desired image processing may include errors, e.g., if the processing incorrectly interprets a shadow as an actual image element of the digital image.

With frequent use of mobile device cameras to capture digital images, inclusion of unwanted shadows is particularly frequent and problematic. For example, users often position their mobile devices above a document to capture an image of the document. In these and similar contexts, the positioning of the mobile device often causes a shadow across the document being captured.

Shadow detection, however, is often difficult, problematic, and prone to error. For example, existing techniques may identify false positives, such as by incorrectly identifying an image element as a shadow. Existing techniques are also prone to detect false negatives, in which actual shadows are not identified as such.

Additionally, existing techniques may be burdensome to a user. For example, the techniques may require an undesirably long processing time to complete, or may require excessive input from the user.

SUMMARY

According to one general aspect, a computer program product is tangibly embodied on a non-transitory computer-readable storage medium and includes instructions. The instructions, when executed by at least one computing device, are configured to cause the at least one computing device to obtain a first image of an object and a second image of the object, captured by a camera. The instructions, when executed, are further configured to cause the at least one computing device to compare intensity variations between a first intensity map of the first image and at least one of a second intensity map of the second image and a combination intensity map obtained from at least the first intensity map and the second intensity map, and identify a shadow within the first image, based on the intensity variations.

According to another general aspect, a computer program product is tangibly embodied on a non-transitory computer-readable storage medium and includes instructions. The instructions, when executed by at least one computing device, are configured to cause the at least one computing device to divide a first intensity map for a first image into a first portion intensity map, and divide a second intensity map for a second image into a second portion intensity map. The instructions, when executed, are further configured to cause the at least one computing device to generate a combined intensity map, based on the first portion intensity map and the second portion intensity map, generate at least one variation map based on a comparison of the combined intensity map with at least one of the first intensity map portions and the second intensity map portions, and identify a shadow within at least one of the first image and the second image, based on the at least one variation map.

According to another general aspect, a method includes obtaining, while a user holds a camera positioned relative to an object, a first image of the object and a second image of the object, captured by the camera. The method includes comparing intensity variations between a first intensity map of the first image and a combination intensity map obtained from the first intensity map and a second intensity map of the second image, and identifying a shadow within the first image, based on the intensity variations.

The details of one or more implementations are set forth in the accompanying drawings and the description below. Other features will be apparent from the description and drawings, and from the claims.

BRIEF DESCRIPTION OF THE DRAWINGS

FIG. 6 illustrates a second example implementation of the system of FIG. 1.

FIG. 7 illustrates a third example implementation of the system of FIG. 1.

FIG. 8 illustrates a fourth example implementation of the system of FIG. 1, in which no shadows are detected.

DETAILED DESCRIPTION

Figure 1:
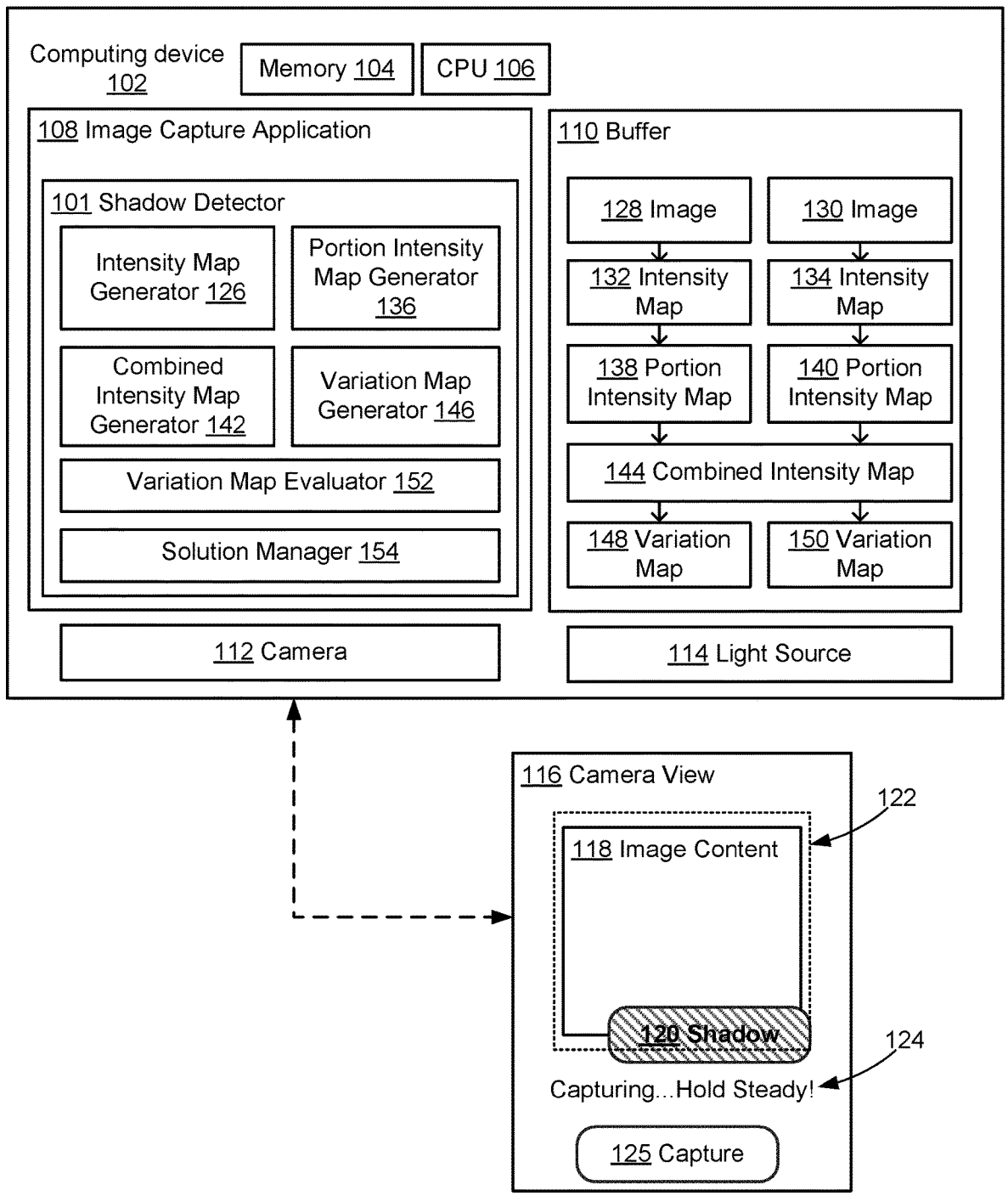
FIG. 1 is a block diagram of a system for image shadow detection using multiple images.

This document describes systems and techniques that provide for image shadow detection using multiple images, such as multiple image frames. Such systems and techniques overcome technical challenges of previous systems and techniques, and improve the process(es) to perform related automated processing. For example, the described techniques provide fast and accurate shadow detection performed using multiple image frames of a document captured by a mobile device camera of a user, including relying on small movements of the user's hand when positioning the camera to capture the document image.

For example, the multiple images, or image frames, may include preview frames that are temporarily displayed, captured, buffered, cached, and/or otherwise utilized by a mobile device or other camera device. For example, when a mobile device is switched to a camera mode, the screen of the mobile device will typically display images of whatever is included in the current field of view of the mobile device, even before the user activates an image capture function (e.g., presses an image capture icon or button). For example, by buffering such preview image frames, mobile device cameras enable faster and/or more accurate image capture once the image capture function is actually initiated (e.g., image capture icon or button is pressed).

Similarly, document capture applications include specialized applications designed and optimized to capture and process documents, and contents thereof (e.g., text recognition). When a document capture application is activated, the document capture application may enter a calibration mode, e.g., to perform edge detection or other preliminary processing of a document to be captured. During such a calibration mode, again, preview image frames may be actively captured and stored for use in normal operations of the application, as well as for implementing the described shadow detection techniques provided herein.

Such described shadow detection techniques utilize an efficient, fast, accurate, complete, and widely-applicable algorithm(s) for detecting and identifying shadows, and for providing corrective measures to reduce or eliminate negative effects of the detected shadows. For example, when shadows are detected, the described techniques may be utilized to automatically turn on a flash or flashlight/torch of the camera being used, in order to eliminate the shadows prior to actual image capture occurring.

In other examples, detected shadows within a captured image may be identified and characterized, e.g., within image metadata. Then, the image metadata may subsequently be used to enable image editing techniques to, e.g., remove the shadows. In still other examples, similar image metadata may be used to enable desired image processing, without necessarily removing the detected shadows. For example, an image of a captured document that includes text may be processed for text recognition, and the image metadata characterizing the presence of the detected shadows may be used to ensure that the text recognition processing is performed accurately.

The described techniques are highly configurable, and enable desired trade-offs between available resources and desired results. For example, the techniques may be implemented using as few as two images, or using a much larger number of images. Generally speaking, for example, using fewer image frames provides faster results, while using more image frames provides more accurate results (while generally taking longer to do so, assuming the availability of the same or similar resources). When greater processing resources are available, more image frames may be used to implement the described techniques, while providing fast, highly-accurate results.

Thus, the described techniques are fast, and provide little or no delay as experienced by the user performing image capture. The user may be provided with multiple options when shadow detection occurs, such as automatic or manual activation of a flash or flashlight, a suggestion to re-position the camera or light source to avoid the detected shadow, or a suggestion for utilization of available image processing techniques that may account for the presence of the shadow. Some of these options may be provided, for example, in the context of an appropriately-configured user interface.

The described techniques provide for inclusive detection of possible shadows, thereby avoiding the likelihood of false negative shadow detections. Nonetheless, the described techniques also provide for detection and identification of outliers that might be erroneously identified as shadows, thereby avoiding false positive shadow detections. Further, the described techniques enable the detection of other image elements that may be desirable to detect or correct, such as an erroneous or undesired inclusion of a border error within a captured image (such as when the image is captured or cropped incorrectly).

In example implementations, an intensity map of each image frame may be constructed. Then, the individual intensity maps may be partitioned or divided into portions, such as cells of a grid or matrix defined with respect to the intensity map. Each portion of each intensity map may be processed to obtain a combined intensity metric (e.g., average intensity metric), and thereby form a combined intensity map. Then, variations between metrics of each of the individual portions and corresponding portions of the combined intensity map may be computed. Portions with variations within (or outside of) a threshold range(s) may be identified as likely candidates for including shadows. Contiguous portions may be considered in relation to one another, either to identify and eliminate outlier values that are not actual shadows, or, conversely, to identify an edge or border of the detected shadow(s).

Further, the additional image frames may be used for additional refinement of the shadow detection results. For example, differences between detected variations with respect to each of the image frames may be used. For example, when three image frames are used, and two of the image frames identify an image portion as an outlier value while the third does not, then the presence of the identified outlier value in a two-to-one majority within the three examined image frames may be taken as further indication that the relevant image portion includes an outlier value, and not an actual shadow.

Additionally, the systems and techniques described herein advantageously improve existing technology areas. For example, as described, computer-based digital image capture and editing are improved. Further, the systems and techniques may be used for a more automated and more efficient and faster approach to performing text recognition and other digital image processing techniques.

FIG. 1 is a block diagram of a system 100 for image shadow detection using multiple images. In the example of FIG. 1, a shadow detector 101 is configured to provide many of the features and advantages described above, and set forth in more detail below, with respect to the remainder of FIG. 1.

In particular, as shown, the system 100 includes a computing device 102 having at least one memory 104, and at least one CPU (central processing unit) 106. The computing device 102 may communicate with one or more other computing devices over a suitable network (not shown in FIG. 1). The computing device 102 may be implemented as a mobile device, such as a tablet device or a mobile phone device, as well as various other types of computing devices that may be used to provide image-taking functions, as described herein.

The system 100 may include an image capture application 108, which may be utilized to implement and provide the shadow detector 101, as shown. The at least one processor (CPU) 106 may represent two or more processors on the computing device 102 executing in parallel, and utilizing corresponding instructions stored using at least one memory 104. The at least one memory 104 represents at least one non-transitory computer readable storage medium. Thus, similarly, the at least one memory 104 may represent one or more different types of memory utilized by the computing device 102. In addition to storing instructions, which allow the at least one processor 106 to implement the application 108, the at least one memory 104 may be used to store data.

In the example of FIG. 1, a specific example of the memory 104 is illustrated separately as a buffer 110. As described in more detail below, the buffer 110 may generally represent any buffer, cache, or other suitable type of memory that may be used by the shadow detector 101 to perform the types of shadow detection described herein, including storing data captured by a camera 112.

Specifically, in the example of FIG. 1, the camera 112 is illustrated as a component of the computing device 102, and has access to, and can interface with, other components of the computing device 102, including the image capture application 108, the buffer 110, and a light source 114. As referenced above, in many of the example implementations described herein, the computing device 102 may be described as a smartphone or mobile phone, configured to provide the various features and functions described herein. In these and similar implementations, a camera view 116 of the camera 112 may represent a display screen of the smartphone or other mobile device, which is typically used to frame and capture image content 118 being captured by the camera 112. In such implementations, the light source 114 may represent a light, flashlight, or torch incorporated into the mobile device, and configured to interface with the camera 112 to act as a flash for the camera 112 during flash photography.

In other implementations, of course, the camera 112 may represent a standalone device with sufficient computing and networking capabilities to provide the various aspects of the system 100 described herein. In such implementations, for example, the light source 114 may represent a flash of the camera 112.

Regardless of the specific hardware implementation of the computing device 102, the camera view 116 may be understood to represent a suitable display, or a view provided by such a display, with which a user may orient and position the computing device 102 (or portion thereof) with respect to the image content 118 that is to be captured. Thus, in the smartphone or other mobile device scenarios referenced above, a user wishing to capture an image of the image content 118 may hold and position his or her smartphone or other mobile device relative to the image content 118, and positioned and oriented to capture an entirety of the image content 118 that is desired to be captured.

As referenced above, however, it commonly occurs that a portion of the image content 118 is at least partially obscured by a shadow 120 that the user does not wish to include within the image being captured. In particular, various examples are described below in which the image content 118 represents a document or other paper. In such scenarios, it is common for a user to place the document on a horizontal surface, and to hold a smartphone or other example of the computing device 102 relative to the document, so as to capture content of the document using the camera 112.

As a result, it is common for light illuminating the document to be captured to be at least partially blocked by the smartphone or other mobile device being used to execute the capture, thereby resulting in the presence of the shadow 120. The shadow 120 may thus result in a reduction in an aesthetic quality of the image being captured. Moreover, it is often the case that an image of a document is captured for the express purpose of obtaining and analyzing contents of the document, such as when the user wishes to perform text recognition of written text within the document. As a result, in addition to any reductions in aesthetic quality of the captured image, the shadow 120 may cause functional errors in operations of the image capture application 108, as well.

As referenced above, and described in detail below, the shadow detector 101 associated with the image capture application 108 may be configured to detect a presence, shape, and other characteristics of the shadow 120, and to take corrective action so as to avoid the types of negative effects just mentioned. For example, upon detection of the shadow 120, the shadow detector 101 may initiate operation of the light source 114, so as to thereby eliminate a presence of the shadow 120. In other implementations, the shadow detector 101 may store metadata characterizing the shadow 120 to be stored in conjunction with the captured image, so that such metadata may be utilized later for post-capture processing of the captured image.

In more specific example implementations described below with respect to FIGS. 2-10, the image capture application 108 may represent a document scanning application that is specifically designed to capture document images and to perform associated processing. For example, the image capture application 108 may be configured to perform boundary or edge detection of the document being captured, to ensure a threshold image quality needed to perform desired processing of the document contents, and to otherwise facilitate smooth capture, processing, and storage of/access to the captured document content.

Such document scanning applications are widely popular, because they allow mobile phone users to capture documents and associated content, in many different settings and contexts, and without requiring separate scanning hardware elements or devices. As a result, users are provided with numerous advantages, such as the ability to store electronic files without having to maintain paper backup copies, as well as abilities such as emailing or otherwise sharing the document contents, searching for desired document content from among a large number of documents, and otherwise generally enjoying the benefits electronically storing and accessing data.

Nonetheless, as also referenced, such document scanning through the use of the camera 112 presents specific challenges, as well. In addition to a likelihood of inclusion of the shadow 120, paper documents are prone to exhibit glare from external light sources, and such glare may obscure text of the document being captured, or otherwise interfere with operations of the image capture application 108. In particular, the light source 114 itself may be a source of such glare, so that many users initially attempt to perform a desired document capture without use of the light source 114.

In further examples, as also referenced above, a minimum image quality of the document being captured is generally required, in order to ensure a desired operation of the image capture application 108. For example, text of the captured document must be sufficiently clear to enable optical character recognition thereof.

Still further, there is a practical limit to the extent to which a user will be able to hold his or her hand completely still, when positioning the computing device 102 relative to the document being captured. In other words, even though the user will attempt to hold his or her hand in a single, stable position while capturing the desired image, there will invariably be at least some small movement of the user's hand, and thus of the computing device 102 (e.g., smartphone) itself.

In order to ensure sufficient image quality, boundary detection, and other image capture characteristics required for desired operations of the image capture application 108, the image capture application 108 may provide an image capture window 122 within the camera view 116. In other words, as shown, the image capture window 122 defines and visually indicates a border and orientation, which may be used to facilitate the user's efforts in aligning and positioning the computing device 102, and thus the camera view 116, with respect to document or other image content 118 being captured. In specific example implementations, the image capture application 108 may perform an initial detection of an attempt of the user to capture the image content 118, using the image capture window 122.

The image capture application 108 may then provide an instruction 124, illustrated as "capturing . . . hold steady!", which alerts the user that a capturing process is proceeding. When the image capture application 108 determines that the image content 118 has been framed successfully, a corresponding image capture may be executed. For example, in FIG. 1, a capture icon 125 represents any known or future technique for executing such an image capture. For example, the capture icon 125 may represent a user interface element of the camera view 116, or a physical button of the computing device 102. In other implementations, the capture icon 125 may represent, or include, an automatic capture functionality that is executed upon detection of a suitable positioning of the computing device 102 by the user in response to the instruction 124.

Thus, during these and related implementations, a framing period represents a window or period of time during which the user frames the image content 118 within the camera view 116, such as may occur through the use of the image capture window 122. During this framing period, images may be captured and temporarily stored, e.g., using the buffer 110, and these images may be used by the shadow detector 101 to detect and characterize the shadow 120.

In the specific examples just given, and in other examples, the framing period may be an explicit, definable period of time during which an attempted camera stabilization is performed by the user, where such stabilization is required to meet or exceed a minimum threshold stabilization as determined by the image capture application 108, and established prior to proceeding with a capture and storage of an image of the image content 118.

As referenced above, however, it will be appreciated that the system 100 may be utilized in many different image capture scenarios. For example, the image content 118 may represent virtually any physical item or object that may be photographed using the camera 112, and is not limited to documents or image content described with respect to any other example implementation of the system 100 provided herein.

Further, the framing period need not be an explicitly defined period of time, and may refer more generally to any period of time during which the user positions the computing device 102 relative to the image content 118, and before capture of the image content 118 using the capture icon 125. Put another way, the framing period may refer to any period of time following a positioning of the camera view 116 to display an image of the image content 118 therein, and prior to the capture of an image of the image content 118 by the use of the capture icon 125.

Images or image frames captured during the framing period, which are typically viewed during a preview process of the user that occurs prior to virtually any type of digital image capture, may thus be referred to herein as preview images, or preview frames. In this regard, an image frame should be understood generally to refer to any single or discrete image from among a series of two or more images, including two or more images of the same image content 118 that are captured proximate to one another in time.

During the framing period, the shadow detector 101 may implement an intensity map generator 126 that is configured to utilize at least two images 128, 130 that are captured in sequence as the user positions the camera view 116 with respect to the image content 118. As just referenced, therefore, the images 128, 130 may be understood to represent or include, in various implementations, at least two image frames that are captured consecutively, or temporally proximate to one another, during the framing period of time in which the user attempts to hold the camera view 116 steady with respect to the image content 118.

Thus the intensity map generator 126 may be configured to proceed to generate an intensity map 132 from the image 128, and also generating an intensity map 134 with respect to the image 130. Specific examples of the intensity maps 132, 134 are provided below, e.g., with respect to FIG. 2.

In general, however, it will be appreciated that such intensity maps generally refer to representations of corresponding images in which pixel values of the images in question are quantified in an intensity map that corresponds in shape, position, and orientation to its underlying image. In other words, the word intensity in this context generally refers to the fact that pixel values of an image being captured are proportional to an amount of light, or light intensity, that has reached the relevant sensor(s) of the camera 112. For example, the intensity map 132 may thus represent variations in pixel values relative to the light captured by the camera 112, and mapped to corresponding positions or pixels of the image 128. As referenced above, examples of the intensity maps 132, 134 are illustrated and described below, e.g., with respect to FIG. 2.

As shown in FIG. 1, the shadow detector 101 further includes a portion intensity map generator 136 that is configured to generate a portion intensity map 138 from the intensity map 132, and to generate a portion intensity map 140 from the intensity map 134. As illustrated and described below with respect to specific examples in the context of FIGS. 3 and 4, the portion intensity maps 138, 140 divide the respective, corresponding intensity maps 132, 134 into defined portions.

For example, the intensity map 132 may be divided into a suitable matrix, grid, or other internal division. In certain implementations, then, each portion corresponds to a cell of a corresponding matrix or grid.

As described in detail below, each portion of the portion intensity map 138 (and the portion intensity map 140) may undergo certain local processing, if desired. For example, each portion of the portion intensity map 138 may be defined using a local mean or average intensity value for that portion, and/or surrounding or nearby portions.

A combined intensity map generator 142 may be configured to utilize the portion intensity maps 138, 140 in combination with one another to generate a combined intensity map 144. For example, if the portion intensity maps 138, 140 define portions such as a 10×10 grid, or a 100×100 grid, then the combined intensity map 144 would correspondingly be sized 10×10, or 100×100. More generally, grid sizes or other proportions of the various maps may be varied to virtually any degree (e.g., 15×15, or 20×20), with the understanding that tradeoffs will generally be present between grid size, processing time, and result quality. In this way, for example, each portion of the combined intensity map 144 will correspond to a corresponding portion of each of the portion intensity maps 138, 140.

For example, as illustrated and described in detail below, e.g., with respect to FIGS. 5-10, each portion of the combined intensity map 144 may represent a mean or average of the two corresponding portions of the portion intensity maps 138, 140. For example, if the portion intensity map 138 has a value of $x_1$ at a position (1,1), and the portion intensity map 140 has a value of $x_2$ at position (1,1), then a value at position (1,1) of the combined intensity map 144 might be $(x_1+x_2)/2$.

Then, a variation map generator 146 of the shadow detector 101 may be configured to generate a variation map 148 that represents variations between portions of the portion intensity map 138 and corresponding portions of the combined intensity map 144. Similarly, the variation map generator 146 may generate a variation map 150 that represents variations between values of portions of the portion intensity map 140 and values of corresponding portions of the combined intensity map 144. As illustrated and described in detail below, the variation maps 148, 150 capture and quantify intensity variations that occur as a result of small movements of the user during the framing period in which the images 128, 130 were captured.

For example, during the framing period, a portion of the image content 118 that happens to fall under a border of the shadow 120 within the image 128 may happen to be just outside of the border of the shadow 120 within the image 130, due to intervening movement of the user. That is, a given pixel may be shadowed in the image 128 but not shadowed in the image 130. Conversely, but similarly, a portion of the image content 118 that was initially outside of a border of the shadow 120 during capture of the image 128 may be inside the border of the shadow 120 during the capture of the image 130.

Put another way, it will be appreciated that such pixels that may move into or out of the shadow 120 will exhibit greater variations in intensity, as compared to other pixels within the images 128, 130 of the image content 118 that are consistently inside the shadow 120, or consistently outside of the shadow 120. In practice, then, the single variation map 148 may provide valuable information regarding a presence of the shadow 120, which may be used to take subsequent corrective action, as referenced above and described in detail below.

Moreover, the variation map 150 will provide similar, but potentially slightly different, characteristics for the shadow 120. As a result, consideration of the variation maps 148, 150 in combination with one another may provide additional levels of detail and accuracy with respect to characterizing the shadow 120.

Thus, the shadow detector 101 includes a variation map evaluator 152 that may be configured to perform various types of analyses or other evaluations of the variation maps 148, 150. Moreover, although the simplified example of FIG. 1 only illustrates inclusion of the two images 128, 130, it will be appreciated, as described in many examples below, that a larger number of images may be captured and utilized to generate corresponding numbers of variation maps.

For example, three or more images may be utilized to calculate three or more corresponding intensity maps, which may thus be utilized to calculate three or more corresponding portion intensity maps. In these scenarios, the combined intensity map 144 may represent a combination of all of the three or more generated portion intensity maps. Consequently, three or more corresponding variation maps may also be determined.

In this way, the variation map evaluator 152 may utilize all determined variation maps, and combinations thereof, to attempt to accurately and completely define and characterize a border and other characteristics of the shadow 120. As described with respect to FIG. 9, the variation map evaluator 152 may be configured to utilize the various available variation maps to determine other characteristics of the image content 118, and images thereof. For example, the variation map evaluator 152 may determine an edge or border detection failure that may have occurred with respect to the capture of the image content 118. Further, the variation map evaluator 152 may take corrective action to ensure that false positive shadow detections do not occur, such as when the image content 118 naturally includes color variations that may be mistaken for a presence of a shadow.

Finally in FIG. 1, the shadow detector 101 may also include a solution manager 154, which may be configured to utilize outputs of the variation map evaluator 152 to implement specific responses. For example, as referenced, the solution manager 154 may determine that it is advantageous to activate the light source 114. For example, from a point of view of the user, the user may position the camera view 116 such that the image content 118 is captured within the image capture window 122.

While the instruction 124 instructs the user to hold the computing device 102 steady, the shadow detector 101 may determine a presence of the shadow 120, and may automatically activate the light source 114 to eliminate or reduce the presence of the shadow 120. In other examples, the instruction 124 may be updated to instruct the user to reposition the camera view 116 so as to eliminate the shadow 120. In other example implementations, the solution manager 154 may store metadata characterizing the shadow 120, for use in later processing of the captured image.

Thus, the system 100 of FIG. 1 provides solutions for the technical problem of performing digital image processing to identify and characterize the shadow 120, using multiple images of the same image content 118. For example, an entirety of a specific object, such as a particular paper document, or a set of objects, may be captured twice within the two images 138, 140. Similarly, the same portion of a particular document or other object may be captured within the images 128, 130. As described, by computing variations in included shadows within these multiple images using the described statistical methods and image processing techniques, and variations thereof, described herein, enables a number of possible solutions for removing, or otherwise addressing, the shadow 120.

Figure 2:
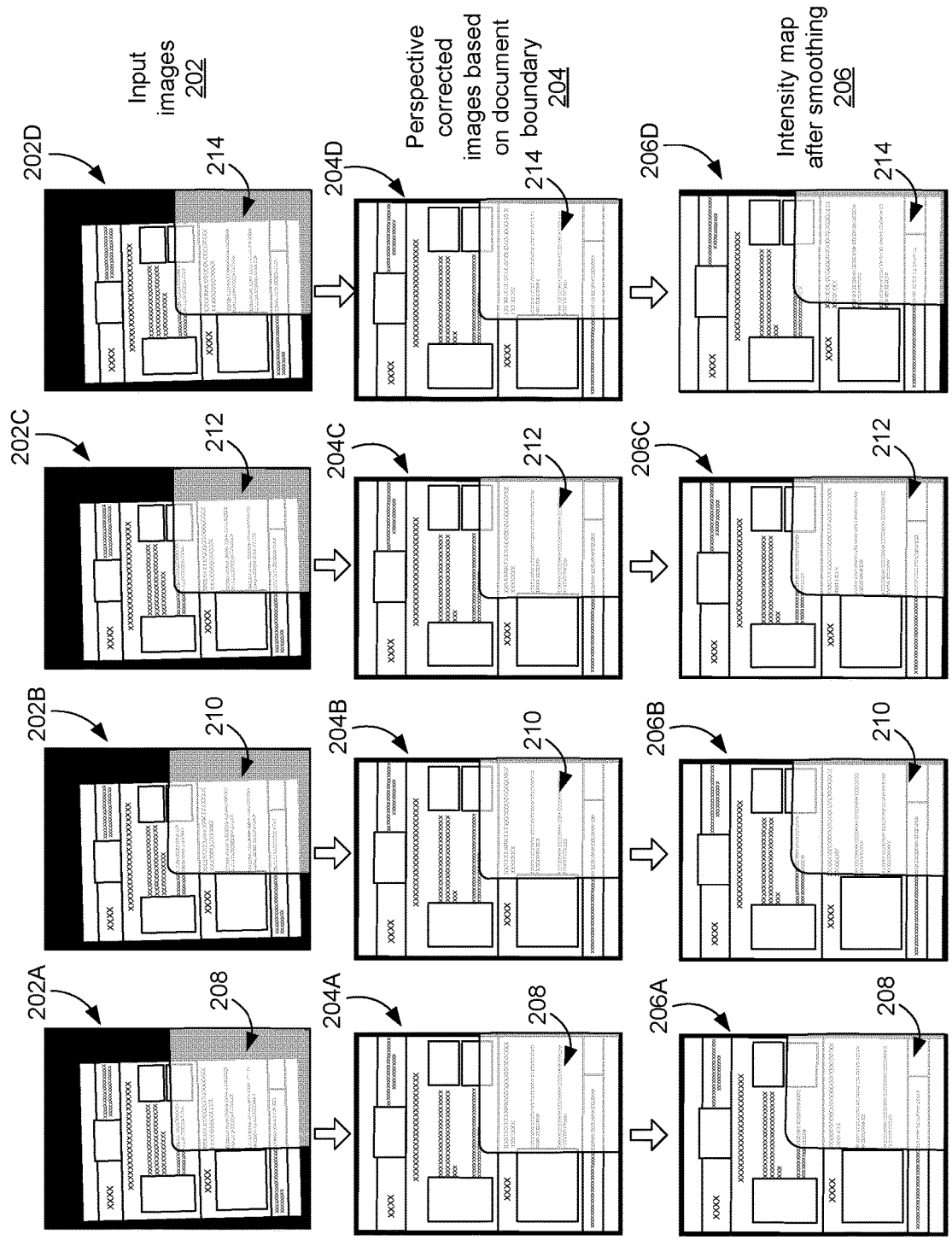
FIG. 2 illustrates example input images and corresponding intensity maps that may be used in the system of FIG. 1.

FIG. 2 illustrates example input images 202, including images 202A, 202B, 202C, and 202D. In other words, the input images 202A-202D of FIG. 2 generally correspond to the images 128, 130 of FIG. 1.

As referenced above, the examples of FIGS. 2-10 generally relate to scenarios in which the input images 202, and other input images described below, include paper documents. The input images 202A-202D are a sequence of images occurring during a framing period of time in which the user of a smartphone or other mobile device seeks to orient and position the mobile device with respect to a document being captured. Of course, as also referenced above, it will be appreciated that the described techniques are also applicable with respect to other scenarios in which two or more images of the same image content have been captured, and including situations in which the shadow being detected is not caused by the mobile device performing the image capture.

In the example of FIG. 2, the various input images 202A-202D are processed using document boundary or edge detection algorithms, to obtain perspective-corrected images 204 of the document being captured. Specifically, as shown, perspective-corrected images 204A, 204B, 204C, and 204D correspond respectively to the original input images 202A, 202B, 202C, and 202D. Thus, for example, the perspective-corrected image 204A represents a document image of the illustrated example document.

In practice, the perspective correction techniques utilized to obtain the document images 204A-204D may be performed by the shadow detector 101, or by appropriate functionality of the image capture application 108. That is, such perspective correction is typically performed, for example, so that the user does not store images with undesired background edges.

The intensity map generator 126 may then proceed to generate intensity maps 206, corresponding to the intensity maps 132, 134 of FIG. 1. Specifically, as shown, the intensity maps 206 include images of intensity maps 206A, 206B, 206C, and 206D, corresponding respectively to perspective-corrected document images 204A, 204B, 204C, and 204D.

As referenced above, the intensity maps 206A-206D generally represent pixel-by-pixel mappings of light intensity, with intensity values quantified and expressed relative to one another within the context of each individual intensity map 206A-206D. Various techniques exist for generating the types of intensity maps 206A-206D of FIG. 2, including smoothening and other processing techniques designed to remove artifacts (e.g., a suitable smoothening filter), and/or normalize the various intensity values with respect to one another, or with respect to a common scale of intensity values.

For purposes of FIG. 2 and the following examples, the intensity maps 206A-206D should be understood to include intensity values that map, on a pixel-by-pixel or portion-by-portion basis to corresponding pixels or portions of respective perspective-corrected images 204A-204D. In this way, as described in detail below, shadows 208, 210, 212, and 214, captured within original input images 202A, 202B, 202C, and 202D, respectively, are captured and included within the intensity maps 206A, 206B, 206C, and 206D, as shown.

Figure 3:
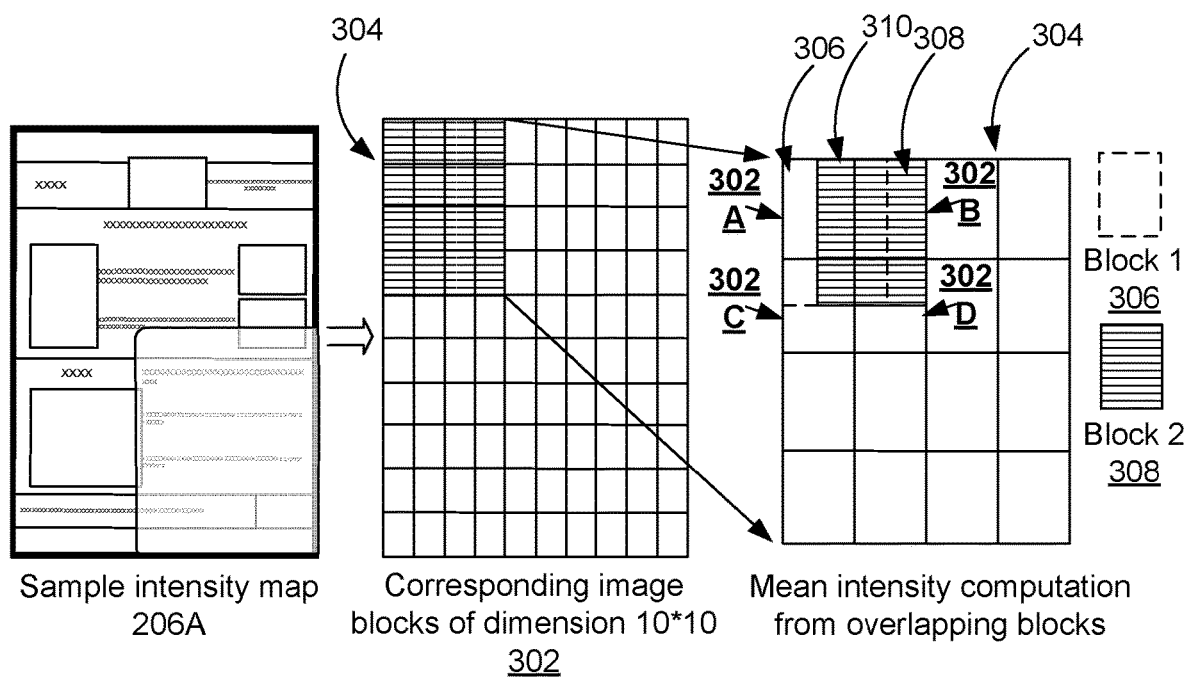
FIG. 3 illustrates example processing of an example intensity map of FIG. 2.
Figure 4:
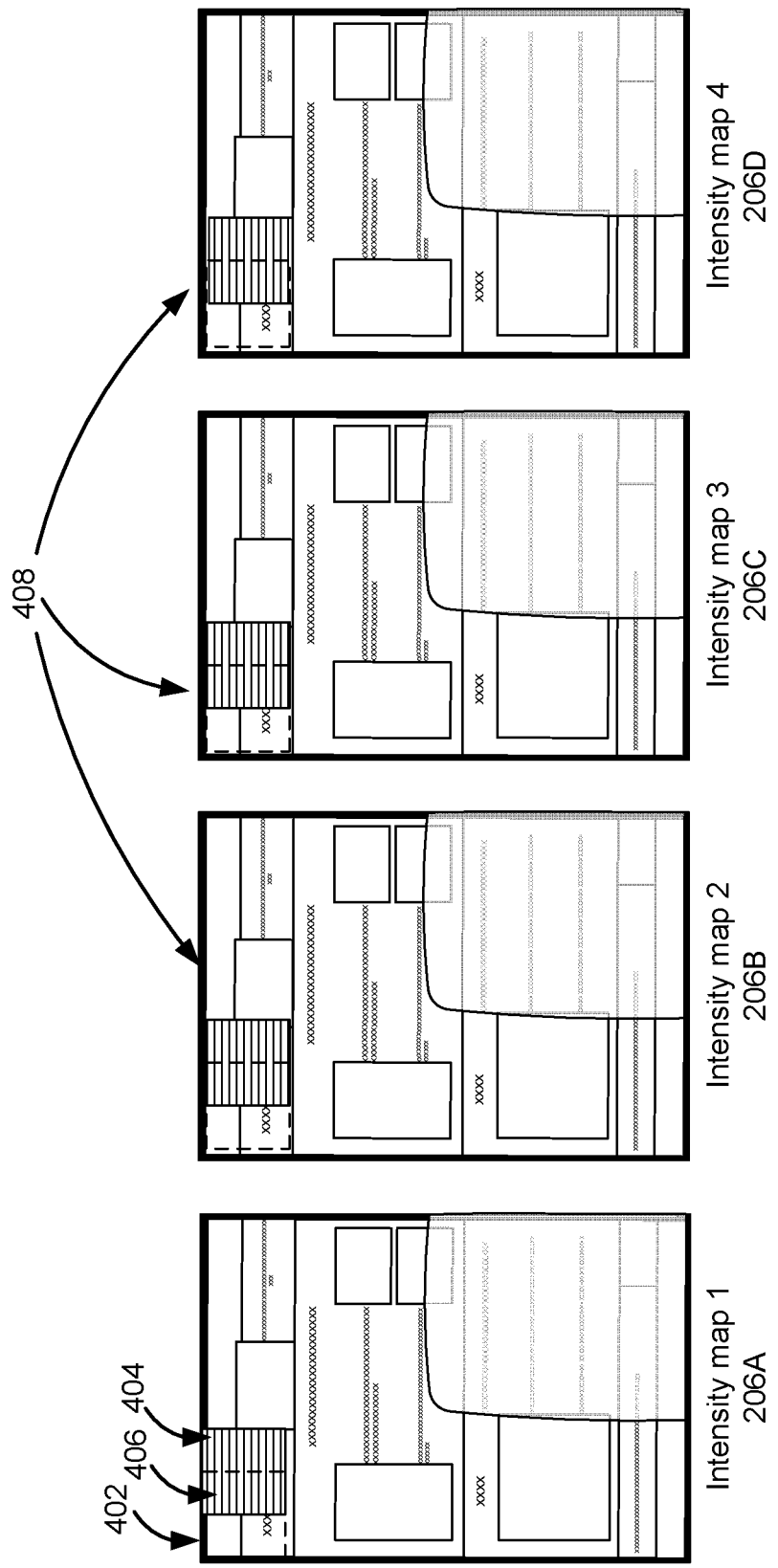
FIG. 4 illustrates processing of the intensity maps of FIG. 2, using the techniques of FIG. 3.

FIGS. 3 and 4 illustrate and describe example techniques for calculating portion intensity maps, such as the portion intensity maps 138, 140 of FIG. 1. Specific, resulting examples of such portion intensity maps are illustrated and described below, with respect to FIGS. 5-10. It will be appreciated that the specific statistical techniques utilized to calculate the portion intensity maps provided and described below with respect to FIGS. 3-10 are non-limiting, and that other suitable statistical and image processing techniques may be used. For example, instead of taking average or mean values, it may be possible to use a median or center value.

In the example of FIG. 3, the intensity map 206A, representing, e.g., the intensity map 132, is taken as an example. As shown, in a partitioned version 302 of the intensity map 206A, the intensity map 206A is divided into a specified number of image blocks. In the example, the partitioned intensity map 302 is divided into a matrix or grid of dimension 10×10 (i.e., has 10×10=100 cells). Of course, other sizes or dimensions may be used in the partitioning process, including the use of non-rectangular and/or irregular partitioning, and/or the partitioned blocks or other shapes need not be identical in size or shape.

Then, for each image block within the 10×10 image blocks of the partitioned intensity map 302, a local mean intensity value may be calculated by considering each such image block together with surrounding image blocks. To illustrate an example computation of local mean intensity, a section 304 of the partitioned intensity map 302 is magnified, and illustrates a first block 306 that includes at least a portion of cells 302A, 302B, 302C, 302D. Specifically, as shown, the block 306 includes all of the cell 302A, and portions of adjacent cells 302B, 302C, 302D. Meanwhile, a second block 308 is illustrated as including all of the cell 302B, as well as adjoining portions of cells 302A, 302C, 302D.

As may be observed, by calculating average intensity values for all of the pixels/cells of the blocks 306, 308, local mean intensity values can be computed, and assigned, e.g., to each of the 10×10=100 partitions of the partitioned intensity map 302. Thus, by considering overlapping and adjoining portions of adjacent partitions, represented by overlap 310 in FIG. 3, the described computations for determining a local mean intensity value for each cell of the 10×10=100 cells may be provided in a manner that minimizes discontinuities and other potential irregularities that may occur at the borders between the partitions of the partitioned intensity map 302. in other example implementations, local mean intensities may be calculated individually for pixels of each of the cells 302A, 302B, 302C, and 302D.

FIG. 4 illustrates an implementation of the example computation techniques of FIG. 3, with respect to the intensity maps 206A-206D of FIG. 2. As shown, image blocks 402, 404, corresponding to the blocks 306, 308 of FIG. 3, may be defined with respect to the intensity map 206A, and thereby defining an overlapping portion 406. Corresponding regions 408 of intensity maps 206B-206D enable the same computations of local mean intensity values for those intensity maps, as well.

Figure 5:
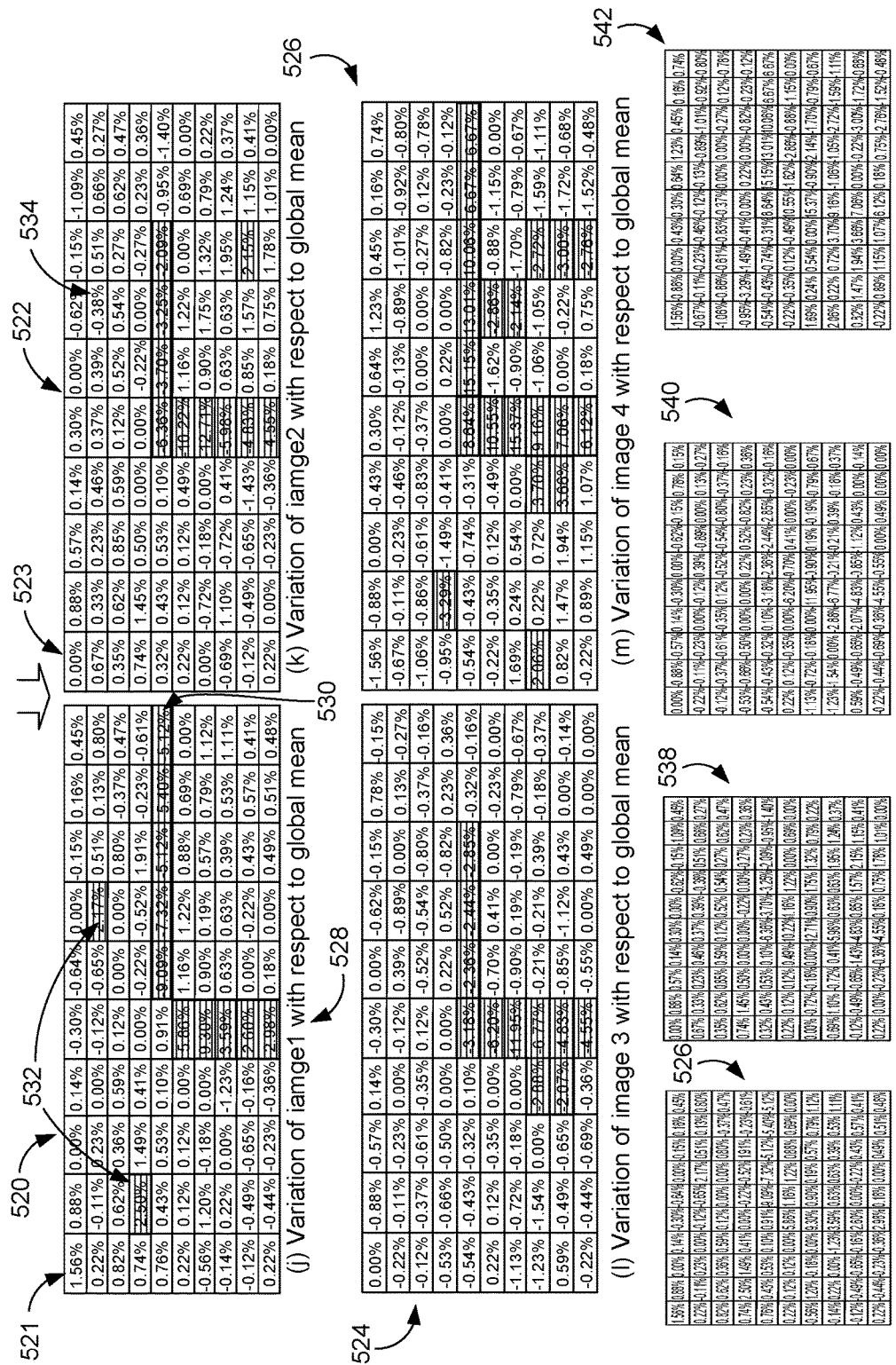
FIG. 5 illustrates a first example implementation of the system of FIG. 1.

FIG. 5 illustrates a first example implementation of the system 100 of FIG. 1, using the techniques described above with respect to FIGS. 2-4. Specifically, as shown, FIG. 5 includes example intensity maps 502, 504, 506, 508, corresponding generally to the example intensity maps 206A-206D of FIGS. 2-4. As already described and illustrated with respect to the corresponding intensity maps 206A-206D, the intensity maps 502, 504, 506, 508 may include corresponding, respective shadows 503, 505, 507, and 509.

Using the techniques just described with respect to FIGS. 3 and 4, portion intensity maps 510, 512, 514, and 516 may be calculated. In other words, the portion intensity maps, 510, 512, 514, 516 correspond generally to the portion intensity maps 138, 140 of FIG. 1, and are generated in a one-to-one relationship with corresponding, respective intensity maps 502, 504, 506, and 508.

Thus, for example, the portion intensity map 510 provides local mean intensity values for the intensity map 502. For example, the portion intensity map 510 is illustrated as being divided into the same 10×10=100 partitions or cells described above with respect to the partition intensity map 302. Then, each such cell is processed together with at least a portion of one or more adjacent cell to obtain a resulting local mean intensity value. For example, a portion 511 of the portion intensity map 510 includes an intensity value "195," and corresponds to the portion 302A of FIG. 3.

Meanwhile, the same computations may be executed in parallel for the remaining intensity maps 504, 506, 508, to thereby obtain corresponding, respective portion intensity maps 512, 514, 516. Consequently, for example, the portion intensity map 512 will include a first portion 513, which is illustrated as including a local mean intensity value of "192." Similarly, the portion intensity map 514 includes a first portion 515 with a local mean intensity value of "192." The local mean intensity of a first portion 517 of the portion intensity map 516 is illustrated in the example as having a value of "189."

Subsequently, a combined intensity map 518, corresponding to the combined intensity map 144 of FIG. 1, may be calculated. As shown, the combined intensity map 518 may be calculated as having the same dimensions as each of the portion intensity maps 510, 512, 514, 516. In particular, each partition or portion of the combined intensity map represents some statistical combination or aggregation of corresponding portions of each of the portion intensity maps 510, 512, 514, 516.

Specifically, as just referenced, portions 511, 513, 515, 517 are illustrated as including local mean intensity values of 195, 192, 192, and 189, respectively. Consequently, a value of a first portion 519 of the combined intensity map 518 is illustrated as a combined or global mean, and therefore has a value of (195+192+192+189)/4=192. As shown, corresponding combined or global mean values of the remaining 99 values of the combined intensity map 518 may be calculated using each set of 4 of corresponding portions of the portion intensity maps 510, 512, 514, 516.

Stated more generally for the example of FIG. 5, the portion intensity maps 510, 512, 514, 516 each represents a 10×10 matrix of local mean intensity values for each of the corresponding, respective intensity maps 502, 504, 506, 508. Using each such matrix, the combined intensity map 518 may be computed as a matrix of 10×10 for global mean intensity values, in which each cell of the global mean intensity matrix is calculated using the Equation (1):

Global Mean Intensity $(J)$=((Local Mean Intensity $(1,J)$+Local Mean Intensity $(2,J)$+ . . . +Local Mean Intensity $(I,J)$)/Total number of Intensity map images  Equation (1)

Notationally, in Equation (1), a local mean intensity of the $J^{th}$ block of $I^{th}$ intensity map image may be represented using local mean intensity (I, J). A total number of intensity map images are expressed as I, so that the global mean intensity of each $J^{th}$ block is computed using Equation (1) to obtain a global mean intensity (J) matrix of the same dimension as the various portion intensity maps.

The variation map generator 146 of FIG. 1 may then be utilized to generate variation maps 520, 522, 524, and 526, corresponding generally to the variation maps 148, 150 of FIG. 1. Taking the variation map 520 as an example, it may be observed that the variation map 520 is a matrix of the same dimension as the combined intensity map 518, and corresponding portion intensity map 510. That is, as illustrated and described above with respect to FIG. 1, the variation map 520 represents a variation between individual cells of the portion intensity map 510, and corresponding cells of the combined intensity map 518.

Thus, for example, a first cell 521 of the variation map 520 illustrates a 1.56% difference that exists between the value "192" of the cell 519 and the value "195" of the cell 511. Similarly, the variation map 522 represents individual cell variations between each cell of the portion intensity map 512 and each corresponding cell of the combined intensity map 518. Consequently, a first cell 523 of the variation map 522 illustrates a 0% difference between the value "192" of the cell 519 and the value "192" of the cell 513.

More generally, the value of each cell of each of the variation maps 520, 522, 524, 526 may be calculated using Equation (2):

Variation $(P,J)$=((Local Mean Intensity $(P,J)$−Global Mean Intensity $(J)$)/(Global Mean Intensity $(J)$)) *100  Equation (2)

Notationally, in Equation (2), the local mean intensity of the $J^{th}$ block of $I^{th}$ intensity map image is represented as Local Mean Intensity (I, J), while the global mean intensity of the $J^{th}$ block is represented as Global Mean Intensity (J). Thus, Equation (2) represents the variation of the $J^{th}$ block of the $P^{th}$ intensity map image.

In the example of FIG. 5, percentage cell values within each of the variation maps 520, 522, 524, 526 that are greater than 2%, or less than −2%, are nominally considered to essentially represent a shadow edge, corresponding to shadows 503, 505, 507, 509. Put another way, in the example, it is expected that, in the absence of the shadow, variations in intensity values between the portion intensity maps 510, 512, 514, 516 and the combined intensity map 518 will fall within a range of −2% to 2%.

On the other hand, as also described above, intensity variations outside these thresholds may occur due to small movements of the user's hand and/or the mobile device being used for image capture, which may cause, e.g., small differences at the edges of the shadows 503, 505, 507, 509. For example, with respect to the variation map 520, a partial column 528 of adjacent cells are hatched to indicate the presence of intensity value variations that are greater than 2%. Similarly, a partial row 530 of intensity value variations includes adjacent cells in which the intensity value variations are below −2%.

As may be observed, the partial column 528 and the partial row 530 generally correspond to a side and top edge of the shadow 503. Although not separately labeled, it may be observed that the variation map 522 similarly includes a partial column and partial row corresponding generally in shape and position to the top and side edge of the shadow 505. Similar comments apply to a partial column and partial row hatched in the variation map 524 with respect to the shadow 507, and partial column/partial row of the variation map 526 in relation to the shadow 509.

Of course, in some cases, it may occur that a variation map will include one or more cells that are outside of the established threshold ranges, but that do not actually correspond to a shadow, and that thus represent false positives. For example, such outlier cells may correspond to included, dark (e.g., black) image portions that may be misinterpreted as shadows, or may simply represent computational artifacts (e.g., as a result of selecting the threshold ranges in a sub-optimal or partially inapplicable manner). For example, in the variation map 520, two cells 532 are illustrated as including values greater than 2%, without corresponding to shadow(s) within the original intensity map 502.

Similarly, but conversely, false negatives may be observed, as well. For example, it may be observed from the variation maps 522 and 524 that the included partial row representing the top edge of respective shadows 505, 507 are incomplete (e.g., do not extend fully to a right edge of the variation maps 522, 524).

As referenced above with respect to FIG. 1, the variation map evaluator 152 may be configured to implement a variety of techniques to minimize or prevent such false positives and/or false negatives. For example, the variation map evaluator 152 may initially identify relevant threshold ranges, and may proceed to designate all individual cells of all available variation maps that are outside the relevant ranges. In other words, for example, the variation map evaluator 152 may designate the various cells of the variation maps 520, 522, 524, 526 that are illustrated therein as hatched cells.

In order to distinguish shadows from false positive outliers, the variation map evaluator 152 may impose a requirement that cells corresponding to shadows must have a minimum number of adjacent shadow edge candidates. For example, the partial column 528 includes five vertically-adjacent shadow candidates. Similarly, the partial row 530 includes five horizontally-adjacent shadow candidates. On the other hand, as shown, the outlier cells 532 appear individually, and are not adjacent to other shadow candidates that are outside the established threshold range.

In addition to such evaluation techniques that may be performed with respect to an individual variation map, it will be appreciated that the variation map evaluator 152 may also be configured to utilize the availability of the plurality of variation maps 520, 522, 524, 526 to execute combined or aggregated variation map evaluations. For example, to remove false positives outliers, the variation map evaluator 152 may compare individual cells of two or more variation maps. For example, of the two outlier cells 532 of the variation map 520, a value of 2.17% is observed in a cell that corresponds to a value of 0.38% in a corresponding cell 534 of the variation map 522. By making similar comparisons with the remaining variation maps 524, 526, the variation map evaluator 152 may deduce that a majority of the values of the relevant cell are within the accepted threshold intensity value range, so that the cell in question is unlikely to correspond to a shadow edge.

Although FIG. 5 is illustrated in the example as generating four variation maps, it will be appreciated that the number of captured images, and corresponding variation maps, may be configured, and may vary. For example, in some implementations, the number of variation maps calculated may be designated to be an odd number. Then, as the variation map evaluator 152 considers each cell of each variation map, any potential false positives or false negatives may be ultimately characterized based on the majority of outcomes of the cell in question. For example, for the cell 534 of the variation map 522, consideration of the variation maps 520 and 524 would result in a 2:1 majority expectation that the cell in question is not representative of a shadow edge.

Finally in FIG. 5, example images 536, 538, 540, 542 are examples of resized versions of the variation maps 520, 522, 524, 526, respectively, in which the resized images 536, 538, 540, 542 illustrate the correspondence between shadow movement regions and the original images, and the variations computed using the techniques described herein. As may be observed, each of the images 536-542 generally illustrates a shape of the shadow edges of corresponding shadows 503, 505, 507, 509. Moreover, taken in the aggregate, as described herein, it is apparent that the images 536-542 enable fast, reliable, and accurate shadow edge detection.

In various implementations, the threshold ranges that are used in evaluating variation maps may be computed using one or more of a plurality of techniques. For example, test data may be captured with respect to a wide variety of documents (e.g., color or black and white documents, magazine or newspaper pages, receipts, notebooks, and any other desired test documents). For each tested document, a number of input images may be designated, and may be captured in the background in regular intervals. For example, interval ranges may be selected on the order of tens or hundreds of milliseconds, e.g., 200 milliseconds. Then, statistical analysis may be carried out on the captured datasets based on local mean intensity, global mean intensity, and variation, as described above.

In some implementations, results may be compared with known shadows in the test data, to correlate the threshold ranges. In various examples, the threshold ranges may be set based on design choices related to acceptable levels of shadow inclusion or exclusion. For example, in scenarios in which it is extremely important to avoid inclusion of shadows, the threshold ranges may be set accordingly (e.g., narrowly, such as below −1% and above 1%). Similarly, but conversely, if a higher level of shadow inclusion is tolerable, a wider threshold range may be set. In various implementations, related configurable parameters may be set by a designer of the image capture application, by an administrator, or by the user.

FIG. 6 illustrates a separate example implementation of the system 100 of FIG. 1. In the example of FIG. 6, original intensity maps 602, 604, 606, 608 include shadows 603, 605, 607, 609, respectively.

As shown, a portion intensity map 610 corresponds to the intensity map 602, and a portion intensity map 612 corresponds to the intensity map 604. Similarly, a portion intensity map 614 corresponds to the intensity map 606, and a portion intensity map 616 corresponds to the intensity map 608.

From the portion intensity maps 610, 612, 614, 616, a combined intensity map 618 may be calculated. As shown, in the example of FIG. 6, the portion intensity maps 610, 612, 614, 616 are computed using local mean intensity values, in accordance with the techniques described above with respect to FIGS. 3-5. The combined intensity map 618 is calculated as including global mean intensity values determined from individual, corresponding cells of the portion intensity maps 610, 612, 614, 616.

Accordingly, a variation map 620 may be calculated with respect to the portion intensity map 610 and the combined intensity map 618. A variation map 622 may be calculated with respect to the portion intensity map 612 and the combined intensity map 618. A variation map 624 may be calculated with respect to the portion intensity map 614 and the combined intensity map 618. A variation map 626 may be calculated with respect to the portion intensity map 616 and the global intensity map 618.

Evaluations of the variation map 620, 622, 624, 626, individually and in the aggregate, may be carried out by the variation map evaluator 152, in correspondence with the techniques described above. For example, each of the variation maps 620, 622, 624, 626 may be observed to have a variety of hatched cells, which may be understood to correspond to cells having values outside of the established threshold ranges for identifying shadow edge candidate cells.

Within each variation map, hatched cells may be evaluated with respect to adjoining cells. Further, cells in the different variation maps 620, 622, 624, 626 may be considered in the aggregate to make determinations with respect to the individual cells. For example, a cell 628 of the variation map 620 is hatched to indicate its value being outside the established threshold range. Since the cell 628 adjoins a number of other shadow edge candidate cells, and since corresponding cells of variation maps 622, 624, 626 are all also outside the established threshold range, the variation map evaluator 152 may proceed to classify the cell 628 as being representative of a shadow edge.

In another example, a cell 630 of the variation map 620 is within the established threshold range, and not initially identified as a shadow edge cell. A corresponding cell 632 of the variation map 622 is also within the established threshold range, as is a cell 634 of the variation map 624. On the other hand, a cell 635 of the variation map 626 corresponds to the cells 630, 632, 634, but is outside the relevant threshold range. Thus, since the cell 635 is the only cell of the set of four cells 630, 632, 634, 635 that is outside the threshold range, the variation map evaluator 152 may determine that the cell in question is not to be included as representative of the shadow edge.

Finally in FIG. 6, images 636, 638, 640, 642 are included to illustrate resized versions of corresponding variation maps 620, 622, 624, 626, and resized to a size of the original intensity maps 602, 604, 606, 608. As shown, the resized images 636, 638, 640, 642 clearly illustrate correspondence of the identified, hatched values of the variation maps 620, 622, 624, 626 in relation to the shadows 603, 605, 607, 609.

FIG. 7 is a third example implementation of the system 100 of FIG. 1. In the example of FIG. 7, black and white images are used to generate intensity maps 702, 704, 706, 708. As shown, each intensity map has corresponding shadows 703, 705, 707, 709.

Portion intensity maps 710, 712, 714, 716 may then be calculated for corresponding, respective intensity maps 702, 704, 706, 708. A combined intensity map 718 may then be generated based on the portion intensity maps 710, 712, 714, 716.

Resulting variation maps 720, 722, 724, 726 illustrate resulting shadow detection. Similarly to FIGS. 5 and 6, FIG. 7 illustrates that the described techniques are capable of identifying and characterizing the shadows 703, 705, 707, 709, based on small shadow movements that may occur as the user positions a mobile device relative to the relevant document being captured.

Figure 8:
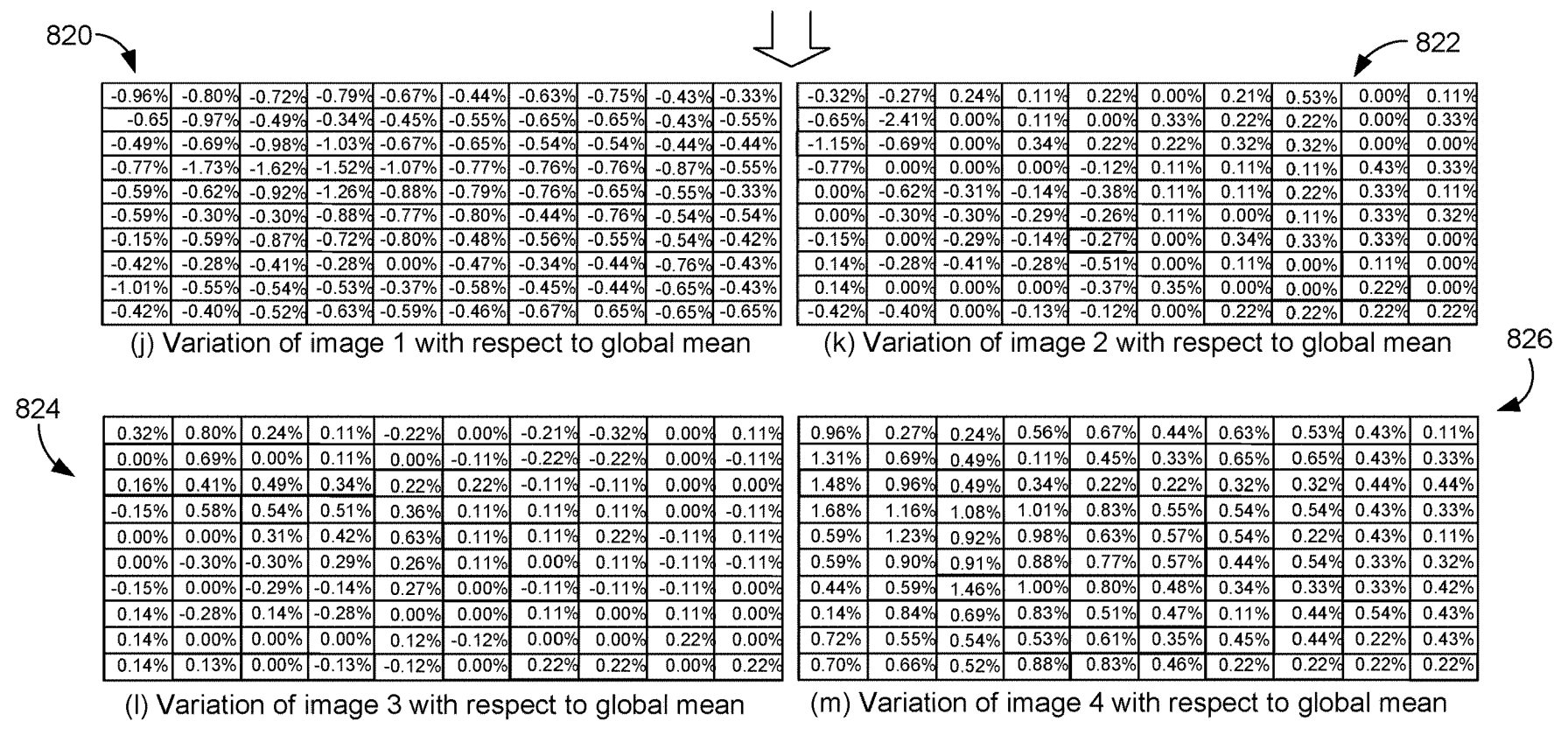

FIG. 8 illustrates a fourth example implementation of the system 100 of FIG. 1. In FIG. 8, images of intensity maps 802, 804, 806, 808 illustrate little or no presence of shadows. Consequently, when considering portion intensity maps 810, 812, 814, 816, and combined intensity map 818, resulting variation maps 820, 822, 824, 826 indicate no shadow or shadow movement visible within the original input images.

Figure 9:
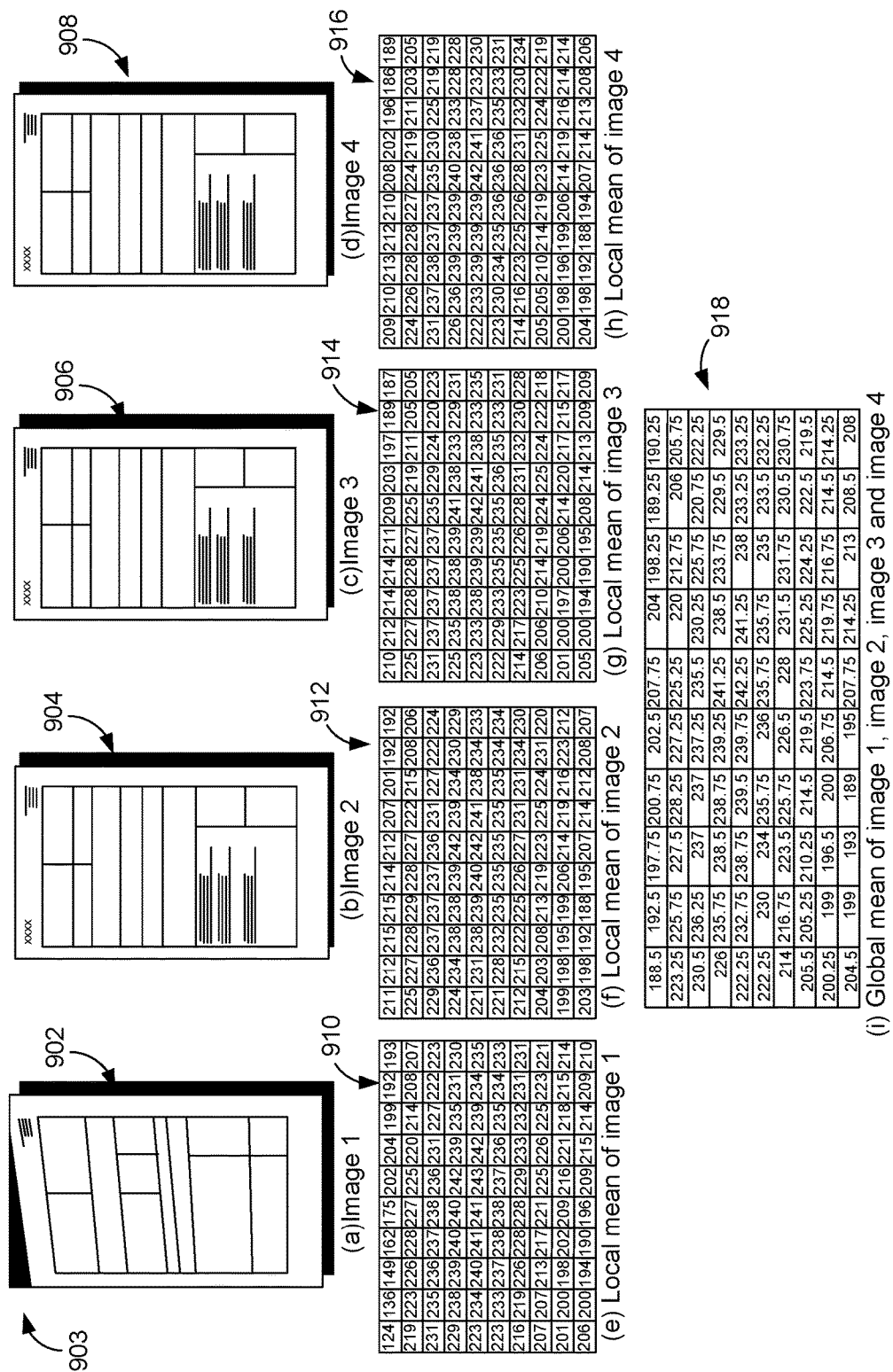
FIG. 9 illustrates a fifth example implementation of the system of FIG. 1, in which a boundary detection failure is detected.

FIG. 9 illustrates a fifth example implementation of the system 100 of FIG. 1. In FIG. 9, images of intensity maps 902, 904, 906, 908 correspond respectively to portion intensity maps 910, 912, 914, 916. The resulting combined intensity map 918 may again be used to generate corresponding variation maps 920, 922, 924, 926.

In the example of FIG. 9, a portion 903 of the image of the intensity map 902 corresponds to a boundary detection failure. In other words, for example, referring back to FIG. 2, it is assumed that the example intensity maps 206 are generated from perspective-corrected images 204, which are generated by performing boundary detection on input images 202 to remove unwanted image portions that exist outside of the original content being captured, but within an image capture window (e.g., within the image capture window 122 of the camera view 116 of FIG. 1).

In some cases, however, the boundary detection performed to obtain the perspective-corrected images 204 may be imperfect or incomplete. In such cases, image portions beyond the actual boundary of the document being captured may incorrectly be included in the captured image. As shown in FIG. 9, and referenced above, the portion 903 represents an example of such a boundary detection error.

As may be appreciated visually from the example of FIG. 9, the portion 903 may be mistaken for a shadow. Nonetheless, the below-described techniques may be utilized as examples of techniques used to avoid such false positive errors with respect to shadow detection. Moreover, the described techniques may be utilized in their own right for purposes of identifying such boundary detection failures.

Specifically, as shown, the variation map 920 corresponding to the image of the intensity map 902 includes a partial row 922 of cells having values outside the −2% to 2% threshold range. To assist in distinguishing from the above-described techniques used for shadow detection, an additional or alternate threshold range is defined. Specifically, maximum values may be set beyond the original threshold ranges, so that cell values outside of the additional threshold ranges may be appropriately distinguished from detected shadows. In the example of FIG. 9, the additional threshold range may be set at values beyond −15%, or above 15%.

In other words, the described techniques establish multiple windows of variation values, corresponding to differing classifications of cells. In the example, inclusion of variations that are below −15% or above 15% indicate the types of boundary detection errors just referenced. In such cases, the presence of intensity values in the local mean intensity map 910 that result from the boundary detection 903 may heavily skew the corresponding global mean values, as illustrated in FIG. 9 and described below. As a result, and as also illustrated and described with respect to FIG. 9, variation values will be skewed for not just the variation map 920, but also for variation maps 922, 924, 926. In such scenarios, for example, it may be desirable to simply remove the relevant image, e.g., the image 902, and proceed with remaining images 904, 906, 908.

Thus, in accordance with the above, when evaluating the variation maps 920, 922, 924, 926, the variation map evaluator 152 may determine that the partial row 928 includes values that are outside of the shadow detection value range. Specifically, the variation map evaluator 152 may execute an algorithm that detects the number of adjacent cells in the partial row 928, having cell values are less than −15%.

It may be observed that the variation maps 922, 924, 926 include a number of cells corresponding to the partial row 928 that are above 2% but below 15%, but that are not identified as shadow portions. As just referenced above, such cell values are not indicative of the presence of shadow portions, but rather occur as statistical artifacts caused by the large outlier values of the partial row 928 of the variation map 920. Put another way, the intensity values corresponding to the portion 903 within the portion intensity map 910, when averaged together with corresponding cells of the portion intensity maps 912, 914, 916, result in skewed combined (averaged) values within corresponding cells of the combined intensity map 918. Consequently, variations between both cells of the combined intensity map and the portion intensity map 912 will demonstrate values well above 2%, even though the corresponding image of the intensity map 904 does not include either shadow portions or boundary detection failures. In such scenarios, images with document boundary detection failures may be discarded from the analysis of shadow detection. In such cases, new input images may be obtained, or the analysis may be repeated using only the remaining intensity maps 904, 906, 908.

Figure 10:
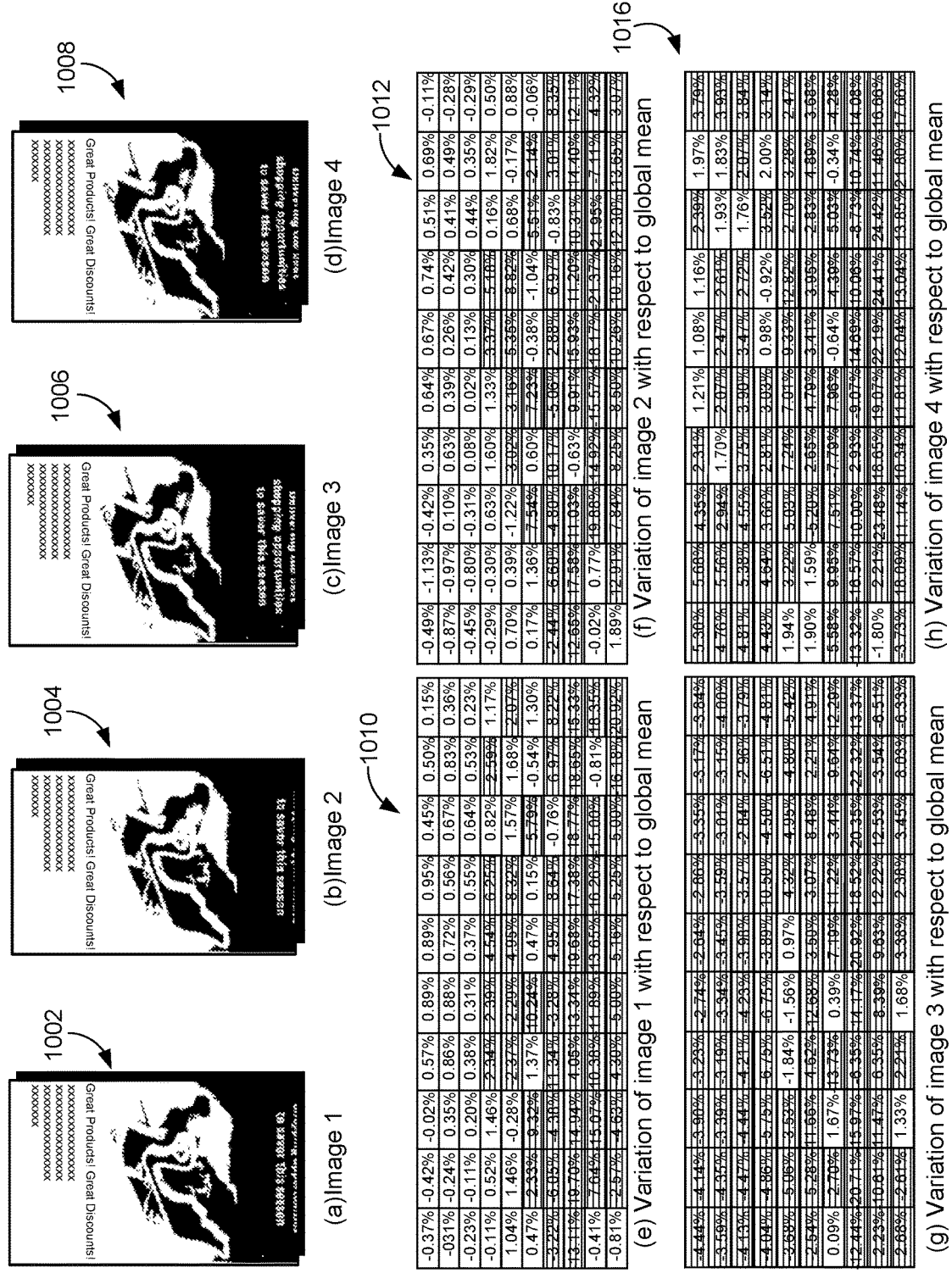
FIG. 10 illustrates a sixth example implementation of the system of FIG. 1, in which false positive shadow detection is avoided.

FIG. 10 illustrates a sixth example implementation of the system 100 of FIG. 1. In the example of FIG. 10, images of intensity maps 1002, 1004, 1006, 1008 are illustrated. For the sake of clarity and conciseness, the respective portion intensity maps and combined intensity map for the images of the intensity maps 1002, 1004, 1006, 1008 are not separately illustrated in the example of FIG. 10. Instead, only the corresponding variation maps 1010, 1012, 1014, 106 are illustrated.

In the example of FIG. 10, the original input images are assumed to have large variations in included colors and shading. As a result, the various variation maps 1010, 1012,

1014, 1016, as shown, all include a large number and percentage of cells that are outside of the threshold range of −2% to 2%.

In other words, in the example of FIG. 10, a number of potentially false positive results are included, due to a nature of the document being captured. Techniques may be utilized nonetheless to ensure that the false positive error is avoided.

For example, using the techniques described above, the variation map evaluator 152 may determine that the variation maps 1010-1016 have a number of relative inconsistencies, and do not demonstrate, in the aggregate, detected shadow portions. Moreover, in additional implementations, the variation map evaluator 152 may execute an algorithm in which a frequency threshold is set with respect to a number or percentage of variation map cells that are outside the established threshold range of −2% to 2%.

For example, a frequency threshold of 70% may be set, so that any variation map which includes over 70% of its cells with values outside the threshold range of 2% may be identified for consideration as including false positives. With other variation map evaluations described above, consideration of the frequency threshold may be applied both with respect to individual variation maps, and with respect to an aggregation of variation maps. For example, in scenarios in which an odd number of variation maps are computed, then a determination that a majority of the variation maps have exceeded the frequency threshold may be utilized to take appropriate corrective action.

Figure 11:
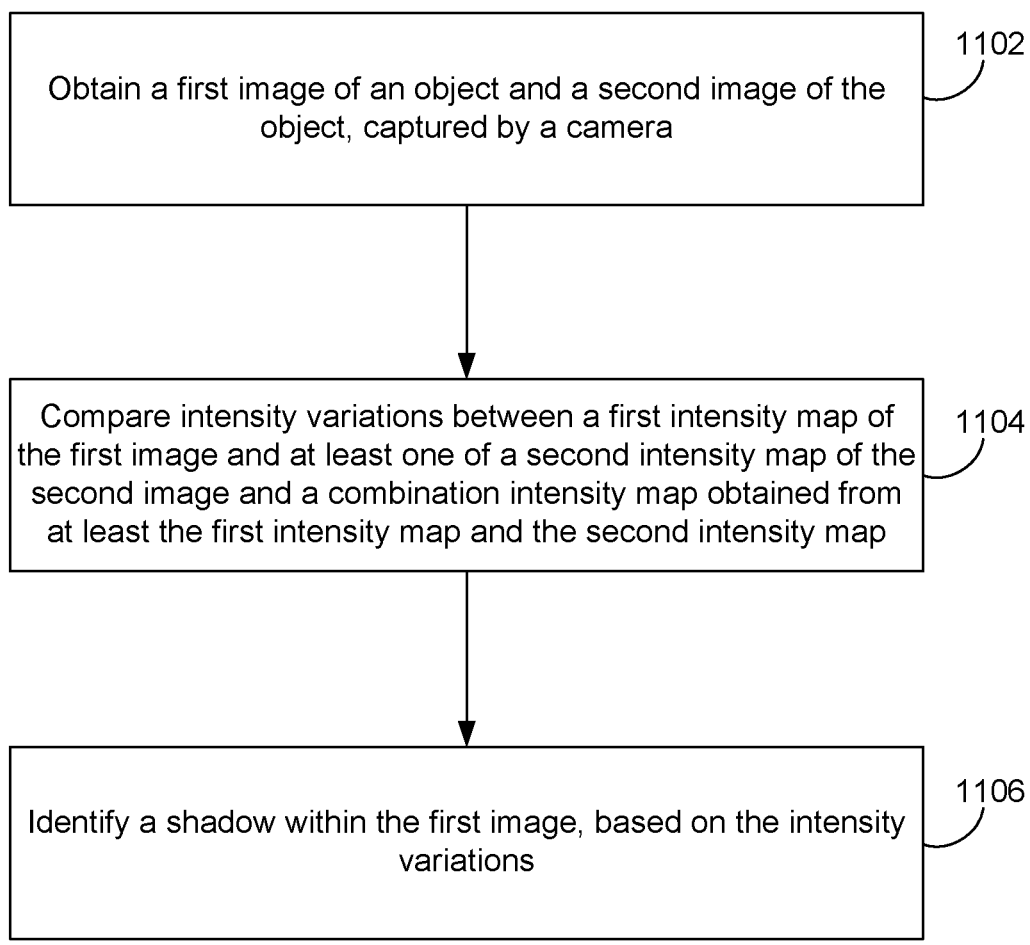
FIG. 11 is a flowchart illustrating example operations of the system of FIG. 1.

FIG. 11 is a flowchart illustrating example implementations of the system 100 of FIG. 1. In the example of FIG. 11, operations 1102-1106 are illustrated as separate, sequential operations. However, in alternative implementations, additional or alternative operations may be included, and one or more of the operations 1102-1106 may be omitted. In any such implementations, the various operations and sub-operations may be executed in a partially or completely overlapping or parallel manner, or in a nested, iterative, or branched fashion.

In the example of FIG. 11, a first image of an object and a second image of the object may be obtained from a camera (1102). For example, the camera 112 may capture the images 128, 130, and the shadow detector 101, e.g., the intensity map generator 126, may obtain the first image 128 and the second image 130 from the buffer 110.

Intensity variations may be compared between a first intensity map of the first image and at least one of a second intensity map of a second image and a combination intensity map obtained from the first intensity map and the second intensity map (1104). For example, the variation map evaluator 152 may evaluate the variations between the intensity map 132 and the combined intensity map 144, as included in the variation map 148. In other implementations, intensity variations may be obtained through the use of the first intensity map and the second intensity map, without the use of the combination map.

A shadow may be identified within the first image, based on the intensity variations (1106). For example, the variation map evaluator 152 may detect that the variations are outside of an established threshold range, such as the −2% to 2% threshold range described herein, and may identify shadow inclusion based thereon.

Figure 12:
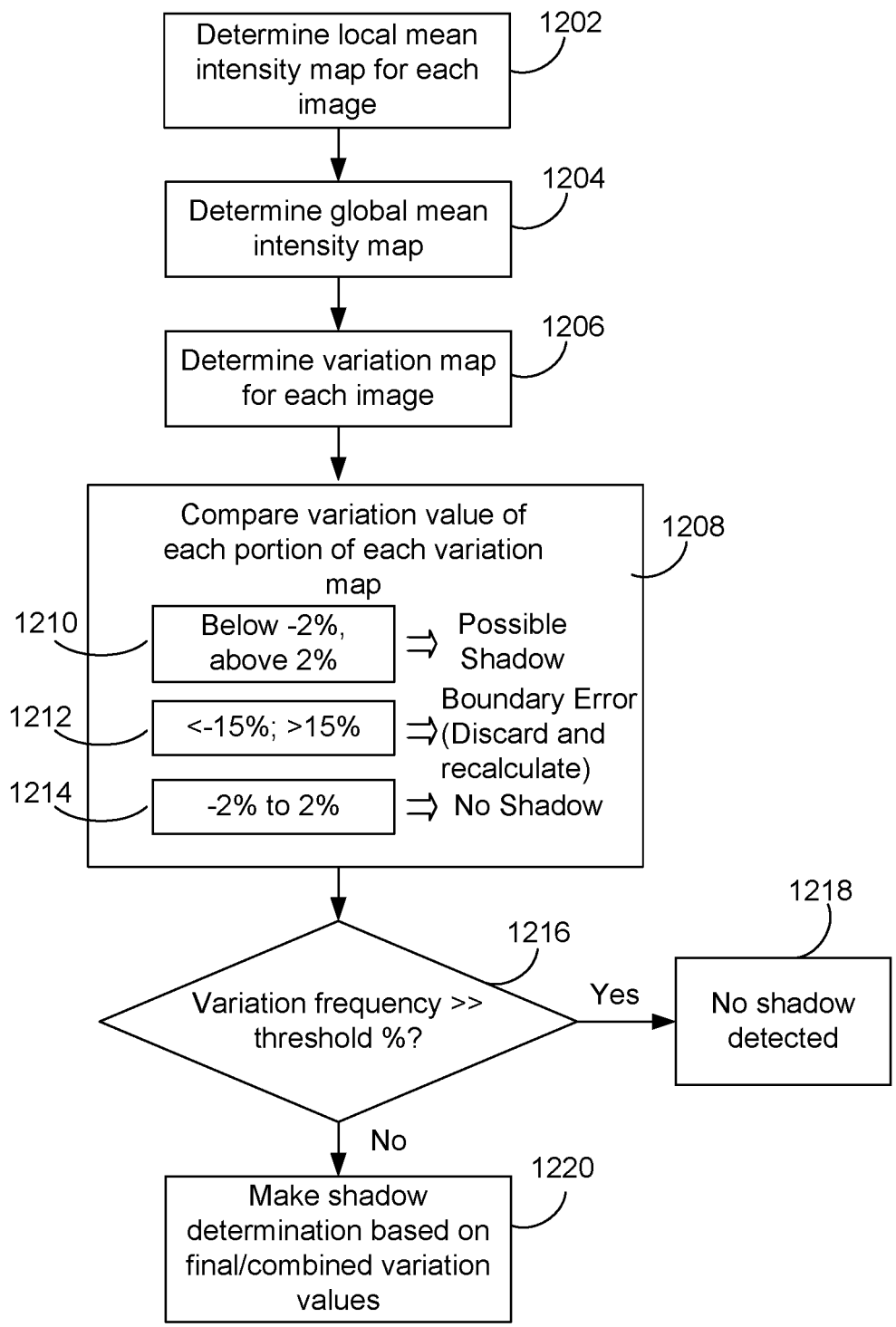
FIG. 12 is a more detailed example flowchart illustrating example operations of the system of FIG. 1.

FIG. 12 is a flowchart illustrating additional implementations of the system 100 of FIG. 1. In the example of FIG. 12, a local mean intensity map is determined for a plurality of intensity maps of a plurality of images (1202). Numerous examples of such local mean intensity maps, as examples of portion intensity maps 138, 140, are provided above, such as 510, 512, 514, 516 of FIG. 5, 610, 612, 614, 616 of FIG. 6, and 710, 712, 714, 716 of FIG. 7.

Then, a global mean intensity map may be determined (1204), such as 518, 618, and 718 of FIGS. 5, 6, 7, respectively. A variation map for each local mean intensity map may be calculated (1206). For example, variation maps 520/522/524/526 of FIG. 5, 620/622/624/626 of FIG. 6, and 720/722/724/726 of FIG. 7 may be calculated.

A variation value of each portion (e.g., cell) of each variation map may be compared to the global mean intensity map (1208). For each cell, if the variation percentage is below −2% or above 2% (or outside of any appropriately-established threshold range), then a shadow candidate cell is detected (1210).

If the variation values are outside of a range for detecting boundary detection errors, then the relevant local mean intensity maps may be discarded, and the calculations repeated (1212). Variations percentages between −2% and 2% may be initially identified as not corresponding to image portions with shadows (1214).

As described with respect to FIG. 10, if the frequency of variations is higher than a defined threshold (1216), e.g., 70%, then the system may determine that it is not feasible to perform shadow detection for the relevant images (1218). Accordingly, corrective action may be taken, such as instructing the user to re-position the camera, or simply capturing the image as-is in order to avoid false positive shadow detections. In other scenarios, the flash or flashlight may be activated, in order to ensure elimination of possible shadows.

Otherwise, a shadow determination may be made based on the final and/or combined variation values (1220). For example, as described, the variation map evaluator 152 may consider all candidate shadow cells and may determine whether such cells occur in isolation, and likely representing outlier cells, or as multiple adjacent cells (e.g., partial rows or partial columns), which might represent a shadow edge. As also described, the variation map evaluator 152 may also consider combinations of variation maps for the images in question, such as by considering each candidate shadow cell of a variation map in combination with corresponding cells of remaining variation maps, in order to determine whether a majority of such corresponding cells indicate shadow presence.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed by at least one computing device, are configured to cause the at least one computing device to:
    obtain a first image of an object and a second image of the object, captured by a camera;
    obtain a first intensity map of the first image and a second intensity map of the second image, each cell of the first intensity map generated from a corresponding cell of the first image and at least one other adjacent cell of the first image, each cell of the second intensity map generated from a corresponding cell of the second image and at least one other adjacent cell of the second image;
    compare intensity variations between the first intensity map of the first image and at least one of the second intensity map of the second image and a combination intensity map obtained from at least the first intensity map and the second intensity map; and
    identify a shadow within the first image, based on the intensity variations.

2. The computer program product of claim 1, wherein the instructions, when executed, are further configured to cause the at least one computing device to:
    divide the first intensity map into a first portion intensity map;
    divide the second intensity map into a second portion intensity map; and
    generate the combination intensity map including combining each portion of the first intensity map with each corresponding portion of the second intensity map.

3. The computer program product of claim 2, wherein the instructions, when executed, are further configured to cause the at least one computing device to:
    generate, for each portion of the first portion intensity map, a corresponding first local mean intensity;
    generate, for each portion of the second portion intensity map, a corresponding second local mean intensity; and
    generate the combination intensity map including generating a global mean intensity for each portion of the combination intensity map, using the corresponding first mean local intensity and the corresponding second local mean intensity.

4. The computer program product of claim 2, wherein the instructions, when executed to compare the intensity variations, are further configured to cause the at least one computing device to:
    generate a first variation map with portions corresponding to the portions of the first portion intensity map, and further corresponding to portions of the combination intensity map,
    wherein each portion of the first variation map includes a relative difference between the corresponding portions of the combination intensity map and the first portion intensity map.

5. The computer program product of claim 4, wherein the instructions, when executed, are further configured to cause the at least one computing device to:
    determine, for each portion of the first variation map, whether the relative difference therein is outside of a threshold range; and
    determine that each portion of the first variation map outside of the threshold range is a candidate portion for representing a corresponding shadow portion of the shadow.

6. The computer program product of claim 5, wherein the instructions, when executed, are further configured to cause the at least one computing device to:
    determine whether each candidate portion of the first variation map is adjacent to a minimum number of additional candidate portions; and
    designate each minimally-adjacent candidate portion as the corresponding shadow portion of the shadow.

7. The computer program product of claim 5, wherein the instructions, when executed, are further configured to cause the at least one computing device to:

generate a second variation map with portions corresponding to the portions of the second portion intensity map, and further corresponding to portions of the combination intensity map,
wherein each portion of the second variation map includes a relative difference between the corresponding portions of the combination intensity map and the second portion intensity map.

8. The computer program product of claim 7, wherein the instructions, when executed, are further configured to cause the at least one computing device to:
determine, for each portion of the second variation map, whether the relative difference therein is outside of the threshold range;
determine that each portion of the second variation map outside of the threshold range is a second candidate portion for representing the corresponding shadow portion of the shadow; and
determine, based on each candidate portion and each second candidate portion, whether each corresponding portion of the first image should be designated as the corresponding shadow portion of the shadow.

9. The computer program product of claim 1, wherein the instructions, when executed, are further configured to cause the at least one computing device to:
activate a light source of the camera, based on the identifying of the shadow.

10. The computer program product of claim 1, wherein the instructions, when executed, are further configured to cause the at least one computing device to:
obtain the first image and the second image during a framing period that follows activation of a viewing frame of the camera, during which the camera is positioned relative to the object within the viewing frame, prior to an initiation of image capture being received at the camera.

11. A computer program product, the computer program product being tangibly embodied on a non-transitory computer-readable storage medium and comprising instructions that, when executed by at least one computing device, are configured to cause the at least one computing device to:
generate a first intensity map of a first image from local mean intensity values of the first image;
generate a second intensity map of a second image from local mean intensity values of the second image;
divide the first intensity map for the first image into a first portion intensity map;
divide the second intensity map for the second image into a second portion intensity map;
generate a combined intensity map, based on the first portion intensity map and the second portion intensity map;
generate at least one variation map based on a comparison of the combined intensity map with at least one of the first intensity map portions and the second intensity map portions; and
identify a shadow within at least one of the first image and the second image, based on the at least one variation map.

12. The computer program product of claim 11, wherein the instructions, when executed, are further configured to cause the at least one computing device to:
divide the first intensity map into the first portion intensity map, each portion of the first portion intensity map including a cell of a first matrix of cells;
divide the second intensity map into the second portion intensity map, each portion of the second portion intensity map including a cell of a second matrix of cells that is the same size and dimension as the first matrix of cells; and
generate the combined intensity map including a third matrix of cells in which each cell of the third matrix of cells is a combination of a corresponding cell of the first matrix and the second matrix.

13. The computer program product of claim 12, wherein the instructions, when executed, are further configured to cause the at least one computing device to:
generate the variation map as including a fourth matrix of cells, in which each cell represents a relative difference between the corresponding cells of the third matrix and at least one of the first matrix and the second matrix.

14. The computer program product of claim 11, wherein the instructions, when executed, are further configured to cause the at least one computing device to:
obtain the first image and the second image from a camera, while a user positions the camera relative to an object.

15. The computer program product of claim 11, wherein the instructions, when executed, are further configured to cause the at least one computing device to:
obtain the first image and the second image during a framing period that follows activation of a viewing frame of the camera by the user, during which the user positions and orients the camera relative to the object within the viewing frame, prior to an initiation of image capture being received from the user at the camera.

16. In a digital medium environment for obtaining digital images, a computer-implemented method of shadow detection comprising:
a step for comparing corresponding portions of a plurality of images obtained from a camera during a framing period that occurs after an object is framed within a view frame of the camera and before an image capture signal is received at the camera;
wherein the comparing generates an intensity map for each of the images, combines the intensity maps into a combined intensity map, generates a variation map including relative differences between the combined intensity map and one of the intensity maps; and
identifying a shadow within at least one of the images from the relative differences that are outside a threshold range.

17. The method of claim 16, wherein the step for comparing comprises:
dividing a first intensity map of the first image into a first portion intensity map;
dividing a second intensity map of the second image into a second portion intensity map; and
generating the combined intensity map including combining each portion of the first intensity map with each corresponding portion of the second intensity map.

18. The method of claim 17, wherein the step for comparing comprises:
generating a first variation map with portions corresponding to the portions of the first portion intensity map, and further corresponding to portions of the combined intensity map, wherein each portion of the first variation map includes a relative difference between the corresponding portions of the combined intensity map and the first portion intensity map.

19. The method of claim 18, comprising:
determining, for each portion of the first variation map, whether the relative difference therein is outside of the threshold range; and determining that each portion of the first variation map outside of the threshold range is a candidate portion for representing a corresponding shadow portion of the shadow.

20. The method of claim 18, comprising:

determining, for each portion of the first variation map, whether the relative difference therein is outside of a threshold range for a border detection error; and determining that each portion of the first variation map outside of the threshold range for the border detection error represents a border detection error in the first image.

* * * * *